(12) United States Patent
Kim et al.

(10) Patent No.: US 12,348,882 B2
(45) Date of Patent: Jul. 1, 2025

(54) WIDE DYNAMIC RANGE IMAGE SENSOR AND METHOD PERFORMED BY THE SAME

(71) Applicant: SAMSUNG ELECTRONICS CO., LTD., Suwon-si (KR)

(72) Inventors: Kyungmin Kim, Suwon-si (KR); Minsun Keel, Suwon-si (KR); Mira Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 152 days.

(21) Appl. No.: 17/991,074

(22) Filed: Nov. 21, 2022

(65) Prior Publication Data
US 2023/0171516 A1   Jun. 1, 2023

(30) Foreign Application Priority Data

Dec. 1, 2021 (KR) .................. 10-2021-0170238
Jun. 29, 2022 (KR) .................. 10-2022-0079992

(51) Int. Cl.
*H04N 25/53* (2023.01)
*H04N 23/10* (2023.01)

(52) U.S. Cl.
CPC ............ *H04N 25/53* (2023.01); *H04N 23/10* (2023.01)

(58) Field of Classification Search
CPC ........ H04N 25/53; H04N 23/10; H04N 25/57; H04N 25/58; H04N 25/589; H04N 25/533; H04N 23/745; H04N 7/0132; H02J 3/002; H05B 45/59
USPC ...................................................... 348/229.1
See application file for complete search history.

(56) References Cited

U.S. PATENT DOCUMENTS

| | | | |
|---|---|---|---|
| 7,446,812 B2 | 11/2008 | Ando et al. | |
| 8,946,614 B2 | 2/2015 | Yun | |
| 9,571,761 B2 | 2/2017 | Ligozat et al. | |
| 9,736,425 B2 | 8/2017 | Gu et al. | |
| 10,306,163 B2 | 5/2019 | Kim et al. | |
| 2009/0015690 A1* | 1/2009 | Yamashita | H04N 23/741 348/229.1 |
| 2013/0027581 A1 | 1/2013 | Price et al. | |
| 2013/0271623 A1* | 10/2013 | Jo | H04N 23/73 348/226.1 |
| 2015/0181103 A1* | 6/2015 | Kimura | H04N 23/75 348/360 |

(Continued)

OTHER PUBLICATIONS

Gu et al., "Coded Rolling Shutter Photography: Flexible Space-Time Sampling," IEEE Xplore, Apr. 2010, Total 9 pages.

*Primary Examiner* — Lin Ye
*Assistant Examiner* — Chan T Nguyen
(74) *Attorney, Agent, or Firm* — Sughrue Mion, PLLC

(57) ABSTRACT

An image sensor is provided. The image sensor includes: a plurality of pixels provided in a pixel array; a controller configured to control a first pixel group of the plurality of pixels to have a first exposure integration time and a second pixel group of the plurality of pixels to have a second exposure integration time; and a signal processor configured to generate image data based on digital signals corresponding to pixel signals generated by the pixel array, by performing operations on a first value of the digital signals corresponding to the first pixel group and a second value of the digital signals corresponding to the second pixel group. The first exposure integration time of the first pixel group is independent of illuminance of the image data.

20 Claims, 27 Drawing Sheets

(56) References Cited

U.S. PATENT DOCUMENTS

| | | | |
|---|---|---|---|
| 2015/0244923 A1* | 8/2015 | Lee .................. | H04N 25/583 |
| | | | 348/234 |
| 2017/0214841 A1 | 7/2017 | Blanquart et al. | |
| 2017/0264831 A1* | 9/2017 | Hyuga .............. | H04N 23/741 |
| 2018/0041724 A1* | 2/2018 | Kim .................. | H04N 25/583 |
| 2021/0266487 A1 | 8/2021 | Noh et al. | |
| 2021/0289154 A1* | 9/2021 | Johnson ........... | H04N 25/587 |

* cited by examiner

WIDE DYNAMIC RANGE IMAGE SENSOR AND METHOD PERFORMED BY THE SAME

CROSS-REFERENCE TO RELATED APPLICATIONS

This application is based on and claims priority under 35 U.S.C. § 119 to Korean Patent Application Nos. 10-2021-0170238, filed on Dec. 1, 2021, and 10-2022-0079992, filed on Jun. 29, 2022, in the Korean Intellectual Property Office, the disclosures of which are incorporated herein by reference in their entireties.

BACKGROUND

The present disclosure relates to an image sensor, and more particularly, to a wide dynamic range image sensor and a method performed by the same.

An image sensor may refer to a device that captures a two-dimensional or three-dimensional image of a subject. The image sensor may generate an image of the subject by using a photoelectric conversion element that responds according to light reflected from or emitted by the subject. There is a need for an image sensor with a wide dynamic range and low noise characteristics for high-quality images.

SUMMARY

The present disclosure provides an image sensor having both a wide dynamic range and better noise characteristics, and a method performed by the same.

According to an aspect of an embodiment, an image sensor includes: a pixel array with a plurality of pixels; a controller configured to control a first pixel group of the plurality of pixels to have a first exposure integration time and a second pixel group of the plurality of pixels to have a second exposure integration time; and a signal processor configured to generate image data based on digital signals corresponding to pixel signals generated by the pixel array, by performing operations on a first value of the digital signals corresponding to the first pixel group and a second value of the digital signals corresponding to the second pixel group. The first exposure integration time of the first pixel group is independent of illuminance of the image data.

According to an aspect of an embodiment, an image sensor includes: a pixel array with a plurality of pixels; a controller configured to control a first pixel group of the plurality of pixels to have a first exposure integration time and a second pixel group of the plurality of pixels to have a second exposure integration time; and a signal processor configured to identify an illuminance based on digital signals corresponding to pixel signals generated by the pixel array, identify the second pixel group and the second exposure integration time based on the illuminance, and set the controller based on the second exposure integration time. The first exposure integration time of the first pixel group is independent of the illuminance.

According to an aspect of an embodiment, a method performed by an image sensor includes: generating digital signals based on pixel signals generated by a pixel array including a plurality of pixels; driving a first pixel group of the plurality of pixels to have a first exposure integration time and a second pixel group of the plurality of pixels to have a second exposure integration time; and generating image data based on a weighted sum of a first value of the digital signals corresponding to the first pixel group and a second value of the digital signals corresponding to the second pixel group. The first exposure integration time of the first pixel group is independent of illuminance of the image data.

BRIEF DESCRIPTION OF THE DRAWINGS

The above and other aspects and features will be more clearly understood from the following description, taken in conjunction with the accompanying drawings, in which.

DETAILED DESCRIPTION

Hereinafter, embodiments are described in conjunction with the accompanying drawings. Embodiments described herein are example embodiments, and thus, the present disclosure is not limited thereto, and may be realized in various other forms. Each embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
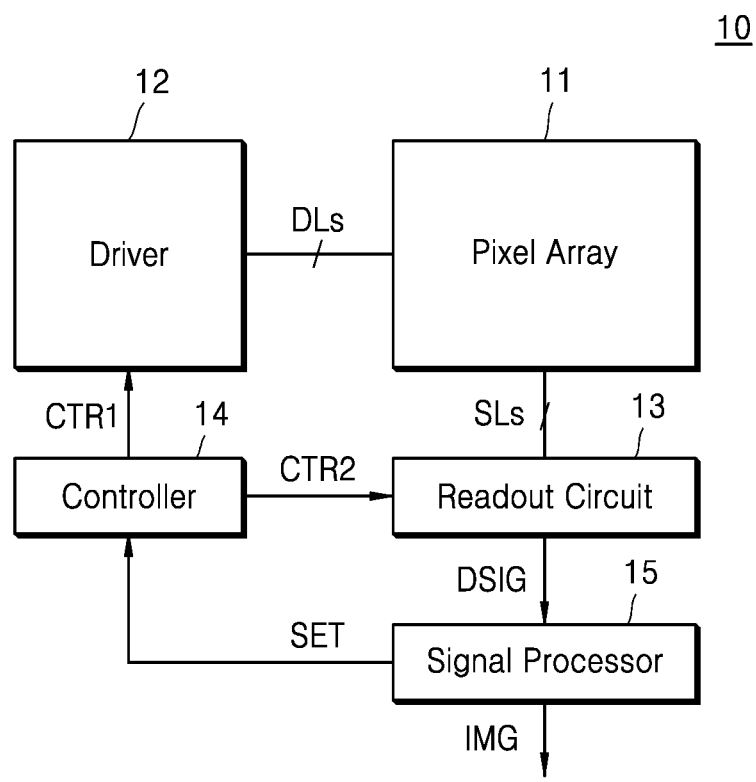
FIG. 1 is a block diagram illustrating an image sensor according to an embodiment.

FIG. 1 is a block diagram illustrating an image sensor 10 according to an embodiment. As shown in FIG. 1, the image sensor 10 may include a pixel array 11, a driver 12, a readout circuit 13, a controller 14, and a signal processor 15.

The image sensor 100 may be included in a system having an image or light sensing function. For example, the image sensor 100 may be included in an electronic device, such as a camera, a smartphone, a wearable device, an Internet of things (IoT) device, a tablet PC, a drone, or an advanced drivers assistance system (ADAS). In addition, the image sensor 10 may be included in parts included in a vehicle, furniture, manufacturing equipment, a door, various measurement devices, and the like.

The pixel array 11 may include a plurality of pixels, and the plurality of pixels may be respectively connected to a plurality of driving lines DLs and a plurality of sensing lines SLs. In some embodiments, the image sensor 10 may be an active pixel sensor (APS), and each of the plurality of pixels of the pixel array 11 may include at least one photoelectric conversion element and at least one transistor. The photoelectric conversion element may generate an electrical signal corresponding to light incident thereon. The photoelectric conversion element, as a non-limiting example, may include light sensing elements made of organic or inorganic materials, such as inorganic photodiodes, organic photodiodes, perovskite photodiodes, phototransistors, photogates, or pinned photodiodes. In some embodiments, as described below with reference to FIGS. 2A and 2B, a pixel may provide two or more conversion gains. In some embodiments, as described below with reference to FIG. 2B, a pixel may include two or more photoelectric conversion elements.

A micro lens may be disposed on each of the plurality of pixels or on two or more adjacent pixels. The pixel may detect light in a feature spectrum region from light received through the micro lens. For example, the pixel array 11 may include a red pixel converting light in a red spectrum range into an electrical signal, a green pixel converting light in a green spectrum range into an electrical signal, and a blue pixel converting light in a blue spectrum range into an electrical signal. A color filter array may be disposed on the plurality of pixels, and a color detectable by the pixel may be determined according to the color filter disposed on the pixel. One pixel may form the image by combining the pixel signals generated in each of the red pixel, the green pixel and the blue pixel, and each of a red pixel, a green pixel and a blue pixel may be referred to as a sub-pixel.

In some embodiments, a pixel may have a multi-layer structure. The multi-layered pixel may include stacked photoelectric conversion elements, and the stacked photoelectric conversion elements may respectively convert different spectrum ranges into electrical signals. Accordingly, electrical signals respectively corresponding to different colors may be output from one pixel. Also, in some embodiments, the pixel may include a photoelectric conversion element that converts light in a particular spectrum range into an electrical signal according to an applied electrical signal.

The driver 12 may drive the pixel array 11 based on the first control signal CTR1 provided from the controller 14. For example, the driver 12 may generate a driving signal based on the first control signal CTR1 and may output the driving signal through the plurality of driving lines DLs. In some embodiments, the driver 12 may drive a plurality of pixels in a row unit of the pixel array 11, and may be referred to as a row driver. For example, the driver 12 may select a row based on the first control signal CTR1, and drive pixels included in the row to output pixel signals from the selected row through a plurality of sensing lines SLs.

The readout circuit 13 may receive pixel signals from the pixel array 11 through the plurality of sensing lines SLs. The readout circuit 13 may convert the pixel signal into a digital signal DSIG, based on the second control signal CTR2 provided from the controller 14. In some embodiments, the readout circuit 13 may include a ramp generator that generates a ramp signal having a voltage which increases or decreases with a constant slope, and may include an analog-to-digital converter (ADC) that converts the pixel signal to a digital signal DSIG based on the ramp signal. For example, the readout circuit 13 may include a plurality of ADCs respectively corresponding to the plurality of sensing lines SLs and receiving a ramp signal in common. Also, in some embodiments, the readout circuit 13 may generate the digital signal DSIG based on correlated double sampling (CDS).

The controller 14 may control the driver 12 through the first control signal CTR1 and may control the readout circuit 13 through the second control signal CTR2. The controller 14 may generate a first control signal CTR1 and a second control signal CTR2 based on a setting of the signal processor 15. For example, as shown in FIG. 1, the controller 14 may receive a setting signal SET from the signal processor 15, and generate the first control signal CTR1 and the second control signal CTR2 based on the setting signal SET, for example based on a setting indicated by the setting signal SET. In some embodiments, the controller 14 may identify a pixel group including at least some of the plurality of pixels of the pixel array 11 and an exposure integration time (EIT) based on the setting signal SET. The controller 14 may generate a first control signal CTR1 based on the identified pixel group and the EIT, and the driver 12 may output a driving signal, based on the first control signal CTR1, through the plurality of driving lines DLs such that the identified pixel group has the identified EIT. Operations of the driver 12 and the readout circuit 13 may be switched according to the timing of the first control signal CTR1 and the second control signal CTR2, and accordingly, the controller 14 may be referred to as a timing controller.

The signal processor 15 may receive the digital signal DSIG from the readout circuit 13 and may generate image data IMG representing an image of a subject. In some embodiments, the signal processor 15 may perform various compensation operations. For example, the signal processor 15 may perform noise reduction, gain adjustment, waveform shaping, interpolation, white balance adjustment, gamma processing, edge enhancement, binning, and the like.

In some embodiments, the signal processor 15 may identify the illuminance of the image based on the digital signal DSIG. The signal processor 15 may divide the pixel array 11 into two or more regions based on the identified illuminance. For example, the signal processor 15 may compare the identified illuminance with at least one predefined reference value, and may divide the pixel array 11 into at least one low illuminance region having an illuminance less than the reference value and at least one high illuminance region having an illuminance greater than or equal to the reference value. Hereinafter, examples in which the pixel array 11 includes at least one low illuminance region and at least one high illuminance region are described, but embodiments are not limited thereto. For example, the pixel array 11 may include regions respectively corresponding to three or more illuminance ranges.

In some embodiments, the signal processor 15 may identify the illuminance of the image based on the digital signal DSIG. The signal processor 15 may identify a pixel group including at least one pixel among the plurality of pixels of the pixel array 11, based on the identified illuminance. As described below with reference to FIGS. 5A to 5E and the like, the signal processor 15 may set the controller 14 so that a pixel group included in the low illuminance region has a relatively long EIT and a pixel group included in the high illuminance region has a relatively short EIT. The setting signal SET may include information about a pixel group and an EIT, and the controller 14 may control the driver 12 through the first control signal CTR1 to drive the pixel group based on information included in the setting signal SET.

In some embodiments, the signal processor 15 may set the controller 14 such that a group of pixels has an illuminance-independent position and EIT. Herein, a pixel group having an illuminance-independent position and EIT may be referred to as a reference pixel group or a reference group, and a pixel included in the reference pixel group may be referred to as a reference pixel. Also, a pixel group having an illuminance-dependent position and EIT may be referred to as an adaptive pixel group or an adaptive group, and a pixel included in the adaptive pixel group may be referred to as an adaptive pixel.

The signal processor 15 may generate the image data IMG by performing operations on values of the digital signal DSIG respectively corresponding to pixel groups having different EITs. Accordingly, the image data IMG may have higher quality, and the performance of the image sensor 10 may be improved. Also, the performance of the application including the image sensor 10 may be improved due to the higher quality of the image data IMG. For example, the image sensor 10 may have a high low-illuminance signal-to-noise ratio (SNR), extended high dynamic range (HDR), and improved SNR dip at high temperatures, and accordingly, may be effectively used in automotive applications that require supporting a poor use environment.

The signal processor 15 may have any structure for performing the operations described above. For example, the signal processor 15 may include at least one of a programmable component, such as a processing core, a reconfigurable component, such as a field programmable gate array (FPGA), and a component that provides a fixed function, such as an intellectual property (IP) core. For example, an IP core may include circuitry to perform specific functions, and may have a design that includes a trade secret.

Figure 2A:
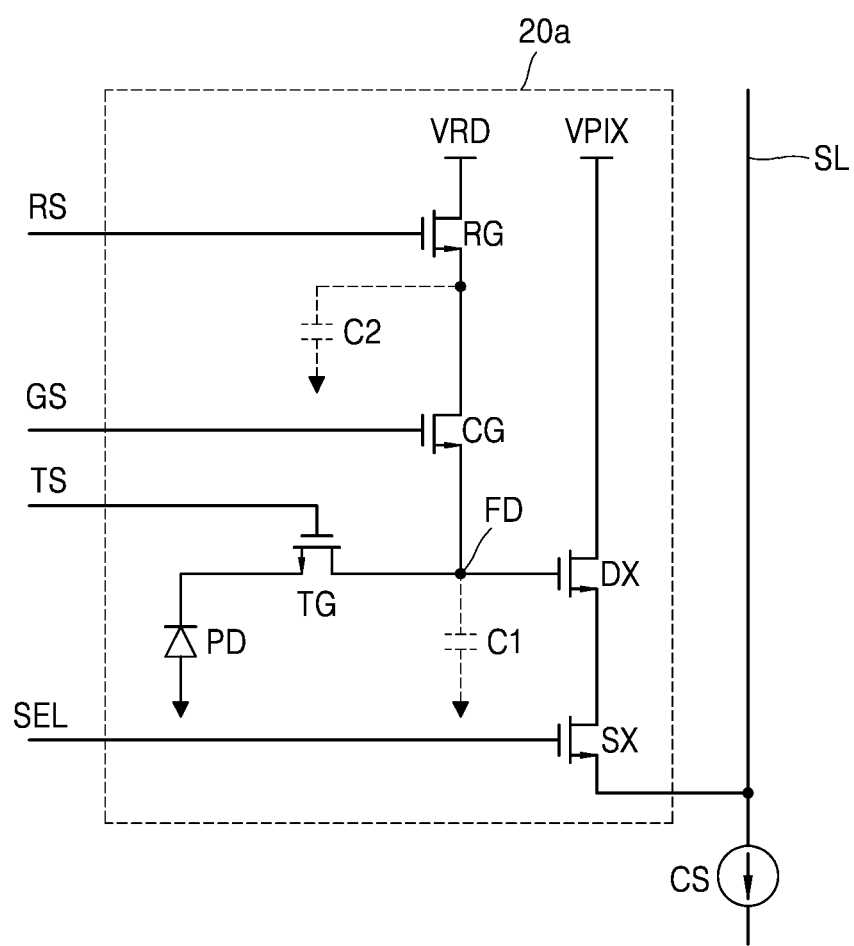
FIGS. 2A and 2B are circuit diagrams illustrating examples of a pixel according to embodiments.
Figure 2B:
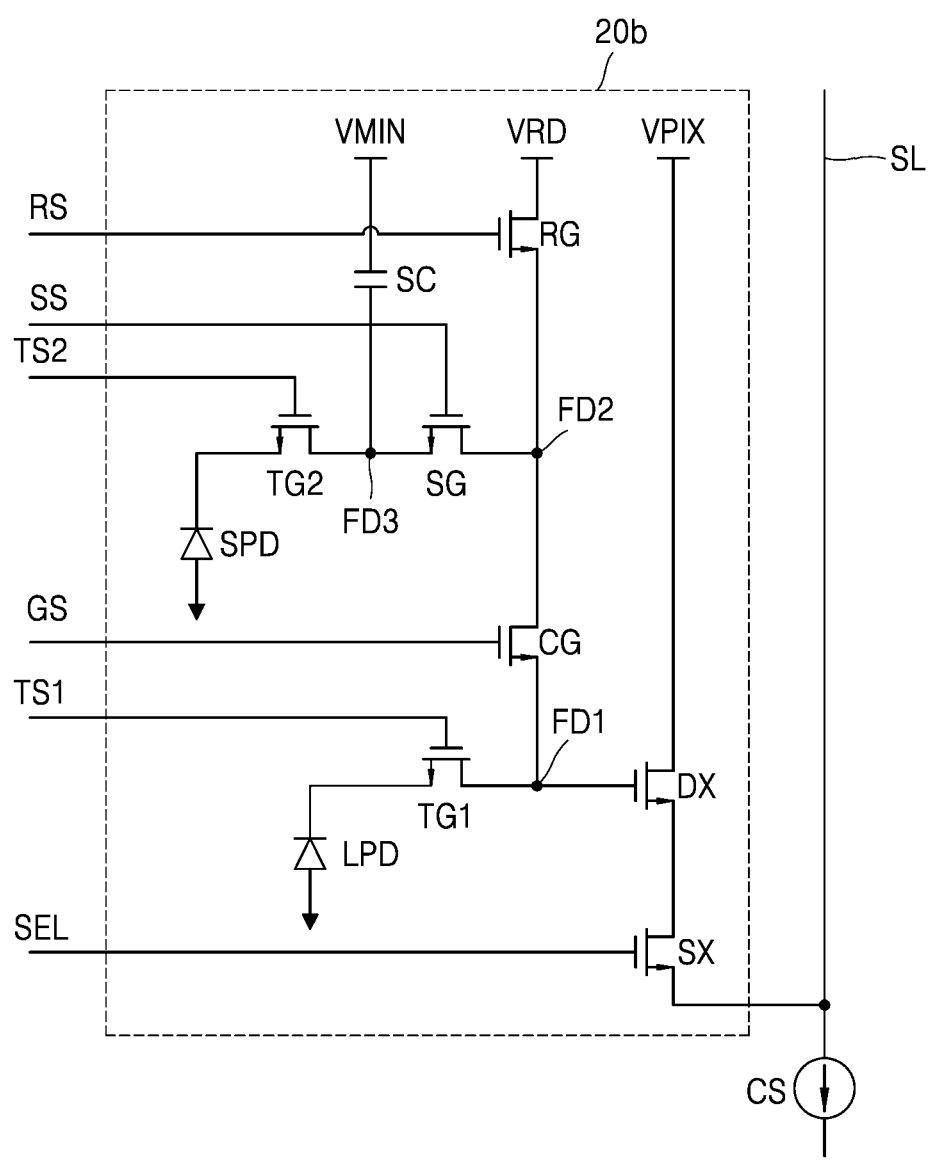

FIGS. 2A and 2B are circuit diagrams illustrating examples of a pixel according to embodiments. In some embodiments, each of pixels 20a and 20b of FIGS. 2A and 2B may be included in the pixel array 11 of FIG. 1. It is noted that the pixels included in the pixel array 11 of FIG. 1 are not limited to the pixels 20a and 20b of FIGS. 2A and 2B. Hereinafter, description that is the same as the description of FIGS. 2A and 2B is omitted.

Referring to FIG. 2A, the pixel 20a may include a photodiode PD, a first capacitor C1, a second capacitor C2, and a plurality of transistors. The plurality of transistors may include a transfer transistor TG, a reset transistor RG, a gain control transistor CG, a driving transistor DX, and a selection transistor SX. In some embodiments, the first capacitor C1 may correspond to a parasitic capacitor of the floating diffusion node FD. In some embodiments, the second capacitor C2 may be a passive element structured to have a fixed or variable capacitance. In some embodiments, the second capacitor C2 may correspond to a parasitic capacitor of a node connected to the source of the reset transistor RG and the drain of the gain control transistor CG.

The photodiode PD is a photoelectric conversion element that may convert light incident from the outside into an electric signal. The photodiode PD may accumulate charges according to the intensity of light. The pixel 20a may receive driving signals provided from the driver 12 of FIG. 1, that is, a reset signal RS, a gain signal GS, a transfer signal TS, and a selection signal SEL.

The reset transistor RG may be turned on in response to the activated reset signal RS, and the gain control transistor CG may be turned on in response to the activated gain signal GS. Accordingly, the reset voltage VRD may be applied to the floating diffusion node FD, and the floating diffusion node FD may be reset. The transfer transistor TG may be turned on in response to the activated transfer signal TS, and accordingly, the photodiode PD may also be reset.

The transfer transistor TG may be turned off in response to the deactivated transfer signal TS, and while the transfer transistor TG is turned off, that is, during the EIT, the photodiode PD may accumulate charges according to incident light. When the transfer transistor TG is turned on in response to the activated transfer signal TS, charges accumulated in the photodiode PD may be transferred to the floating diffusion node FD. When the gain signal GS is deactivated, charges may be accumulated in the first capacitor C1, and when the gain signal GS is activated, charges may be accumulated in the first capacitor C1 and the second capacitor C2. In this regard, when the same amount of charge is accumulated in the photodiode PD, the voltage of the floating diffusion node FD may differ depending on whether the gain signal GS is activated.

The voltage of the floating diffusion node FD may depend on the charge accumulated in the photodiode PD, and may be expressed as a product of the charge accumulated in the photodiode PD and a conversion gain. As described above, the voltage of the floating diffusion node FD corresponding to the same amount of charge may be different depending on whether the gain signal GS is activated, and the conversion gain may vary according to the gain signal GS. That is, when the gain signal GS is deactivated, the pixel 20a may have a high conversion gain (HCG), and when the gain signal GS is activated, the pixel 20a may have a relatively low conversion gain (LCG). As such, the pixel 20a providing two different conversion gains may be referred to as a dual conversion gain (DCG) pixel. Herein, a state in which the gain signal GS is deactivated may be referred to as an HCG mode, and a state in which the gain signal GS is activated may be referred to as an LCG mode. As described below with reference to FIG. 3, the DCG pixel may extend the dynamic range of the image sensor 10.

The driving transistor DX may function as a source follower by the pixel voltage VPIX and the current source CS connected to the sensing line SL, and may transmit the voltage of the floating diffusion node FD to the selection transistor SX. In some embodiments, the current source CS may be shared by pixels connected to the sensing line SL, and may be included in the readout circuit 13 of FIG. 1. The selection transistor SX may provide an output voltage of the driving transistor DX to the sensing line SL, in response to the activated selection signal SEL. The voltage of the sensing line SL may be provided to the readout circuit 13 of FIG. 1 as a pixel signal, and the readout circuit 13 may generate a digital signal DSIG corresponding to the voltage of the sensing line SL.

Referring to FIG. 2B, the pixel 20b may include a large photodiode LPD, a small photodiode SPD, a capacitor SC, and a plurality of transistors. The plurality of transistors may include a first transfer transistor TG1, a second transfer transistor TG2, a switch transistor SG, a reset transistor RG, a gain control transistor CG, a driving transistor DX, and a selection transistor SX. Each of the first to third floating diffusion nodes FD1 to FD3 may have a parasitic capacitance. In some embodiments, the pixel 20b may further include capacitors as passive elements respectively connected to the first to third floating diffusion nodes FD1 to FD3.

The large photodiode LPD and the small photodiode SPD may accumulate charges according to incident light. The large photodiode LPD may have a larger size than the small photodiode SPD, and may be suitable for a low-illuminance subject, while a small photodiode SPD may be suitable for a high-illuminance subject. A pixel structure including photodiodes of different sizes, such as the pixel 20b, may be referred to as a split PD, and in particular, a structure in which the small photodiode SPD is disposed at one corner of the large photodiode LPD may be referred to as a corner pixel.

The pixel 20b may receive driving signals, that is, the reset signal RS, the gain signal GS, the first transfer signal TS1, the second transfer signal TS2, the switch signal SS, and the selection signal SEL, provided from the driver 12 of FIG. 1. The pixel 20b may support the HCG mode and the LCG mode of the large photodiode LPD, and may support the HCG mode and the LCG mode of the small photodiode SPD. Accordingly, the pixel 20b may provide a wider dynamic range than the pixel 20a of FIG. 2A.

The reset transistor RG may be turned on in response to the activated reset signal RS, and thus, the second floating diffusion node FD2 may be reset. The gain control transistor CG may be turned on in response to the activated gain signal GS, and accordingly, the first floating diffusion node FD1 may be reset. Also, the switch transistor SG may be turned on in response to the activated switch signal SS, and accordingly, the third floating diffusion node FD3 may be reset.

In the HCG mode of the large photodiode LPD, the gain signal GS may be deactivated, and accordingly, the gain control transistor CG may be turned off. When the first transfer transistor TG1 is turned on in response to the activated first transfer signal TS1, charges accumulated in the large photodiode LPD may be transferred to the first floating diffusion node FD1. In the LCG mode of the large photodiode LPD, the gain signal GS may be activated, and accordingly, the gain control transistor CG may be turned on. When the first transfer transistor TG1 is turned on in response to the activated first transfer signal TS1, charges accumulated in the large photodiode LPD may be transferred to the first floating diffusion node FD1 and the second floating diffusion node FD2.

In the HCG mode of the small photodiode SPD, the switch signal SW may be deactivated, and accordingly, the switch transistor SG may be turned off. When the second transfer transistor TG is turned on in response to the activated second transfer signal TS2, charges accumulated in the small photodiode SPD may be transferred to the third floating diffusion node FD3 to which the capacitor SC is connected. As shown in FIG. 2B, the capacitor SC may be connected between the node to which the voltage VMIN is applied and the third floating diffusion node FD3. In the LCG mode of the small photodiode SPD, the switch signal SW may be activated, and accordingly, the switch transistor SG may be turned on. When the second transfer transistor TG is turned on in response to the activated second transfer signal TS2, charges accumulated in the small photodiode SPD may be transferred to the third floating diffusion node FD3 and the second floating diffusion node FD2.

Figure 3:
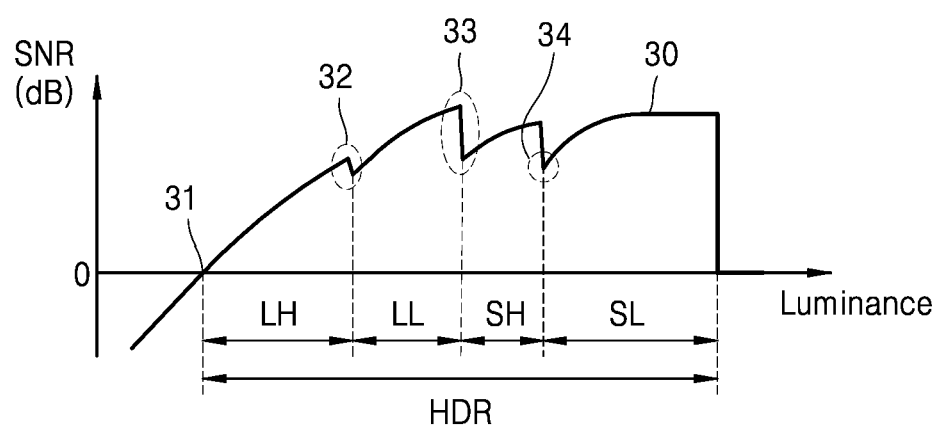
FIG. 3 shows an SNR-HDR graph of an image sensor according to an embodiment.

FIG. 3 shows an SNR-HDR graph of the image sensor 10 according to an embodiment. In the graph of FIG. 3, the horizontal axis represents the intensity of light incident on the image sensor 10, that is, the brightness, and the vertical axis represents the SNR. Hereinafter, FIG. 3 is described with reference to FIG. 1.

In some embodiments, as shown in the pixel 20b of FIG. 2B, a curve 30 in the graph of FIG. 3 represents the characteristics of the image sensor 10 including pixels that include photodiodes of different sizes and support a DCG. Accordingly, the image sensor 10 may provide a wide dynamic range, that is, HDR. For example, as shown in FIG. 3, the HDR may be defined as a section in which the curve 30 has an SNR higher than zero, and may include an LH section, an LL section, an SH section, and an SL section according to the illuminance. In the LH section, the pixel may output a pixel signal corresponding to the charge accumulated in the LPD in the HCG mode, and in the LL section, the pixel may output a pixel signal corresponding to the charge accumulated in the LPD in the LCG mode. In addition, in the SH section, the pixel may output a pixel signal corresponding to the charge accumulated in the SPD in the HCG mode, and in the SL section, the pixel may output a pixel signal corresponding to the charge accumulated in the SPD in the LCG mode. The signal processor 15 may combine regions corresponding to different sections in the image.

The image sensor 10 may be required to simultaneously satisfy various performances. For example, the image sensor 10 may be required to provide a higher SNR 31 at low illuminance, and higher SNRs 32, 33, and 34 at image coupling points between the sections of the curve 30, and extended HDR as shown in FIG. 3. Hereinafter, as described below, pixel groups included in the plurality of pixels may each have different EITs, and image data may be generated by performing operations on values of digital signals corresponding to different pixel groups. Accordingly, the performances described above of the image sensor 10, that is, low-illuminance SNR, SNR at the image coupling points and HDR may all be improved.

Figure 4:
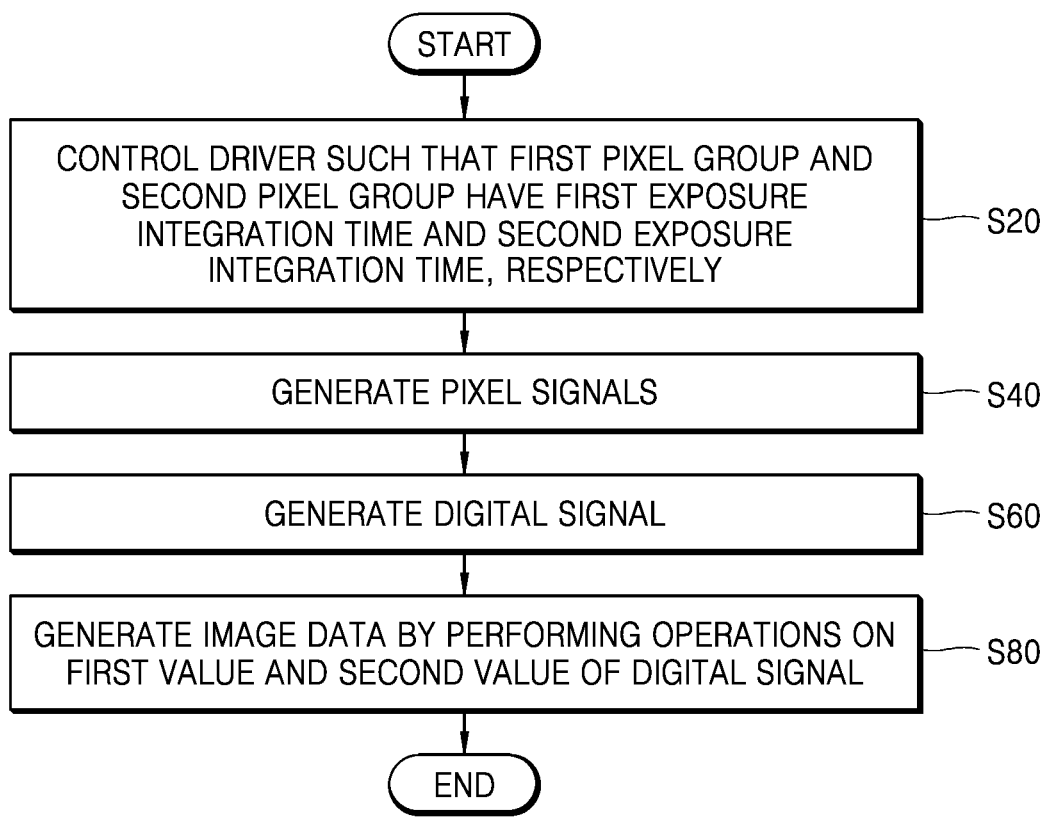
FIG. 4 is a flowchart illustrating a method performed by an image sensor according to an embodiment.

FIG. 4 is a flowchart illustrating a method performed by the image sensor 10 according to an embodiment. Herein, the method of FIG. 4 may be referred to as a method for image sensing. As shown in FIG. 4, the method performed by the image sensor 10 may include a plurality of operations S20, S40, S60, and S80. Hereinafter, FIG. 4 is described with reference to FIG. 1.

Referring to FIG. 4, in operation S20, the driver 12 may be controlled so that the first pixel group and the second pixel group have the first EIT and the second EIT, respectively. For example, the controller 14 may identify the first pixel group and/or the second pixel group and identify the first EIT and/or the second EIT, based on the setting signal SET provided by the signal processor 15. The controller 14 may control the driver 12 through the first control signal CTR1 so that the first pixel group has the first EIT, and the driver 12 may drive the first pixel group through driving signals to have the first EIT. In addition, the controller 14 may control the driver 12 through the first control signal CTR1 so that the second pixel group has a second EIT, and the driver 12 may drive the second pixel group through driving signals to have the second EIT.

In some embodiments, the setting signal SET may include addresses corresponding to the first pixel group and/or the second pixel group in the pixel array 11, and may include values corresponding to the first EIT and/or the second EIT. In some embodiments, the first pixel group may be a reference group, and the first pixel group and the first EIT may be fixed. Accordingly, information on the first pixel group and the first EIT may be omitted from the setting signal SET, and the controller 14 may control the driver 12 through the first control signal CTR1 so that the first pixel group has the first EIT regardless of the setting signal SET.

In operation S40, pixel signals may be generated. For example, the pixel array 11 may sense light based on driving signals provided by the driver 12 through the plurality of driving lines DLs, and output pixel signals through a plurality of sensing lines SLs. The first pixel group may generate pixel signals corresponding to the intensity of light incident during the first EIT, and the second pixel group may generate pixel signals corresponding to the intensity of light incident during the second EIT.

In operation S60, a digital signal DSIG may be generated. For example, the readout circuit 13 may generate a digital signal DSIG from pixel signals received from the pixel array 11 through the plurality of sensing lines SLs. In some embodiments, the readout circuit 13 may generate a digital signal DSIG from pixel signals based on correlation double sampling (CDS).

In operation S80, the image data IMG may be generated by performing operations on a first value and a second value of the digital signal DSIG. The first value of the digital signal DSIG may correspond to the pixel signals generated by the first pixel group, and the second value of the digital signal DSIG may correspond to the pixel signals generated by the second pixel group. The signal processor 15 may perform operations on the first value and the second value, and may generate image data IMG based on the operation result. In some embodiments, the signal processor 15 may calculate a weighted sum of the first value and the second value, and generate the image data IMG based on the weighted sum. An example of operation S80 is described with reference to FIG. 12.

FIGS. 5A to 5E show examples of a pixel array 11 according to embodiments. In detail, FIGS. 5A to 5E show pixel arrays 11*a* to 11*d* including differently grouped pixels. As described above, the plurality of pixels included in the pixel array 11 of FIG. 1 may be grouped into two or more pixel groups, and each of the pixel groups may have its own EIT. It is noted that the pixels included in the pixel array 11 are not limited to those shown in FIGS. 5A to 5E. Hereinafter, description that is the same as the description of FIGS. 5A to 5E is omitted, and FIGS. 5A to 5E are described with reference to FIG. 1.

As described above with reference to FIG. 1, the pixel array 11 may be divided into two or more regions according to illuminance. For example, each of the pixel arrays 11*a* to 11*d* of FIGS. 5A to 5D may be divided into a first region R1 and a second region R2. The first region R1 may be a high illuminance region corresponding to a relatively high illuminance, and the second region R2 may be a low illuminance region corresponding to a relatively low illuminance. The low illuminance region may include pixels having a relatively long EIT, and the high illuminance region may include pixels having a relatively short EIT. Different from that shown in FIGS. 5A to 5D, the pixel array 11 may be divided into three or more regions. In some embodiments, the divided region in the pixel array 11 may be classified into one of three or more regions including a low illuminance region and a high illuminance region.

In some embodiments, the pixel array may include a reference pixel group (or reference group) that includes fixedly positioned pixels and has a fixed EIT. For example, in the pixel arrays 11*a* to 11*d* of FIGS. 5A to 5D, the first pixel group G1 may be a reference pixel group, and may have a fixed position and a fixed EIT in each of the pixel arrays 11*a* to 11*d*. In detail, when the reference pixel group includes some rows of a pixel array, such as the first pixel group G1 of FIGS. 5A and 5B, the reference pixel group may be referred to as a reference row. FIGS. 5A to 5D respectively show a first pixel group G1 as an example of a reference pixel group, but the reference pixel group is not limited to the first pixel group G1 of FIGS. 5A to 5D.

Figure 5A:
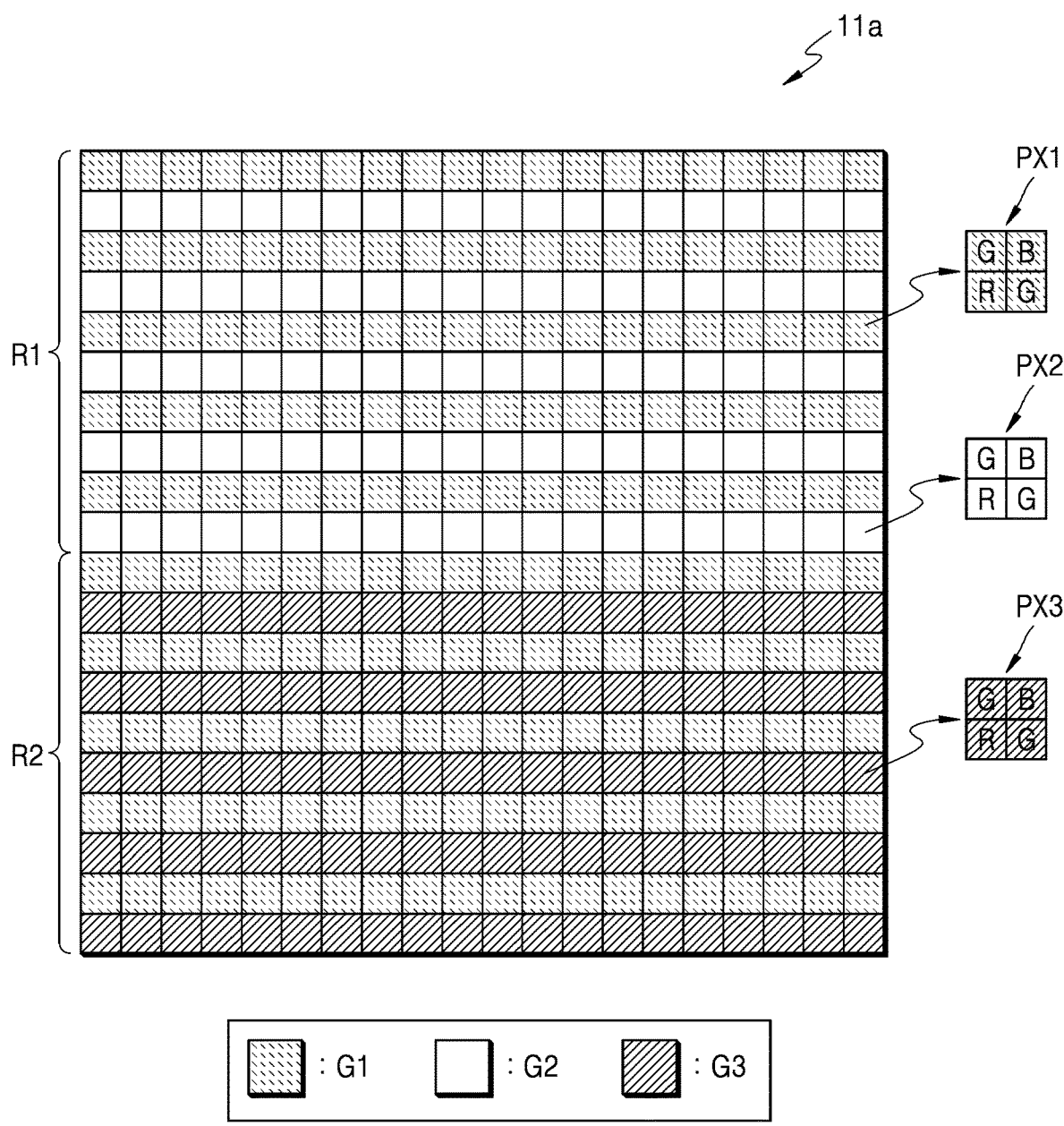
FIGS. 5A, 5B, 5C, 5D and 5E illustrate examples of a pixel array according to embodiments.

In some embodiments, each of the pixels included in the pixel group may include a plurality of sub-pixels. For example, as shown in FIGS. 5A, 5C and 5D, the first pixel PX1 included in the first pixel group G1 may include two green sub-pixels G, a red sub-pixel R, and a sub-blue pixel B. In addition, the second pixel PX2 of the second pixel group G2 and the third pixel PX3 of the third pixel group G3 may also include two green sub-pixels G, a red sub-pixel R, and a sub-blue pixel B. As shown in FIG. 5A, two green sub-pixels G, a red sub-pixel R, and a blue sub-pixel B corresponding to one pixel in an image may be referred to as a Bayer pattern.

Referring to FIG. 5A, the pixel array 11*a* may be divided into a first region R1 and a second region R2. For example, the signal processor 15 may divide the pixel array 11*a* into a first region R1 corresponding to high illuminance and a second region R2 corresponding to low illuminance based on the digital signal DSIG. The signal processor 15 may generate a setting signal SET such that the first region R1 includes a pixel having a short EIT and the second region R2 includes a pixel having a long EIT. For example, as shown in FIG. 5A, the signal processor 15 may generate a setting signal SET such that the second pixel group G2 has a short EIT in the first region R1 and the third pixel group G3 has a long EIT in the second region R2.

The first pixel group G1 may include pixels regularly distributed in the pixel array 11*a* independently of illuminance. For example, as shown in FIG. 5A, the first pixel group G1 may include odd rows of the pixel array 11*a*. The first pixel group G1 may have an EIT independent of illuminance, that is, independent of the first region R1 and the second region R2. In some embodiments, the first pixel group G1 may have an EIT of 11 ms due to light-emitting diode (LED) flicker, the second pixel group G2 of the first region R1 may have an EIT (e.g., 5.5 ms, 9 ms, etc.) shorter than or equal to 11 ms, and the third pixel group G3 of the second region R2 may have an EIT greater than or equal to 11 ms (e.g., 22 ms).

Figure 5B:
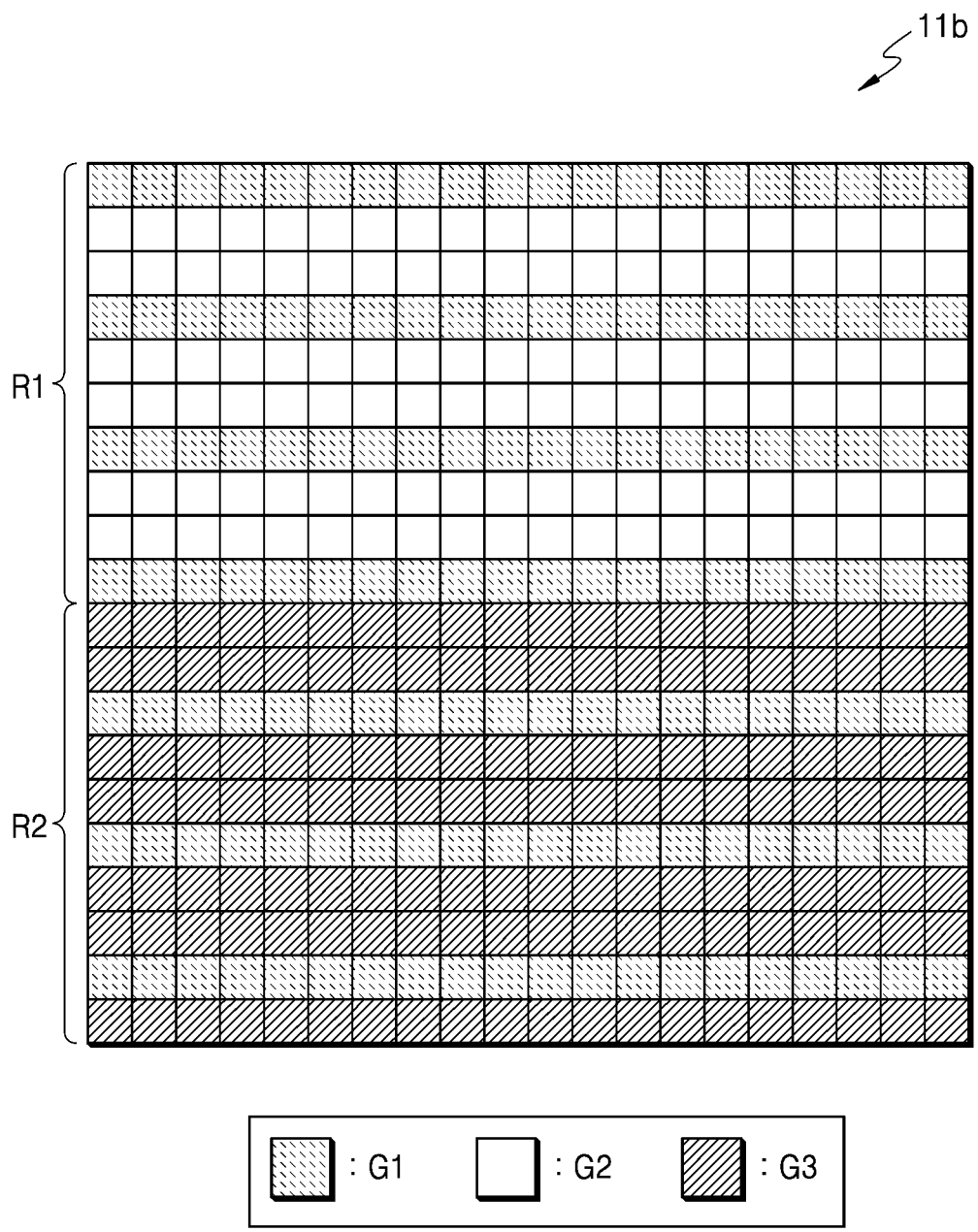
Figure 5C:
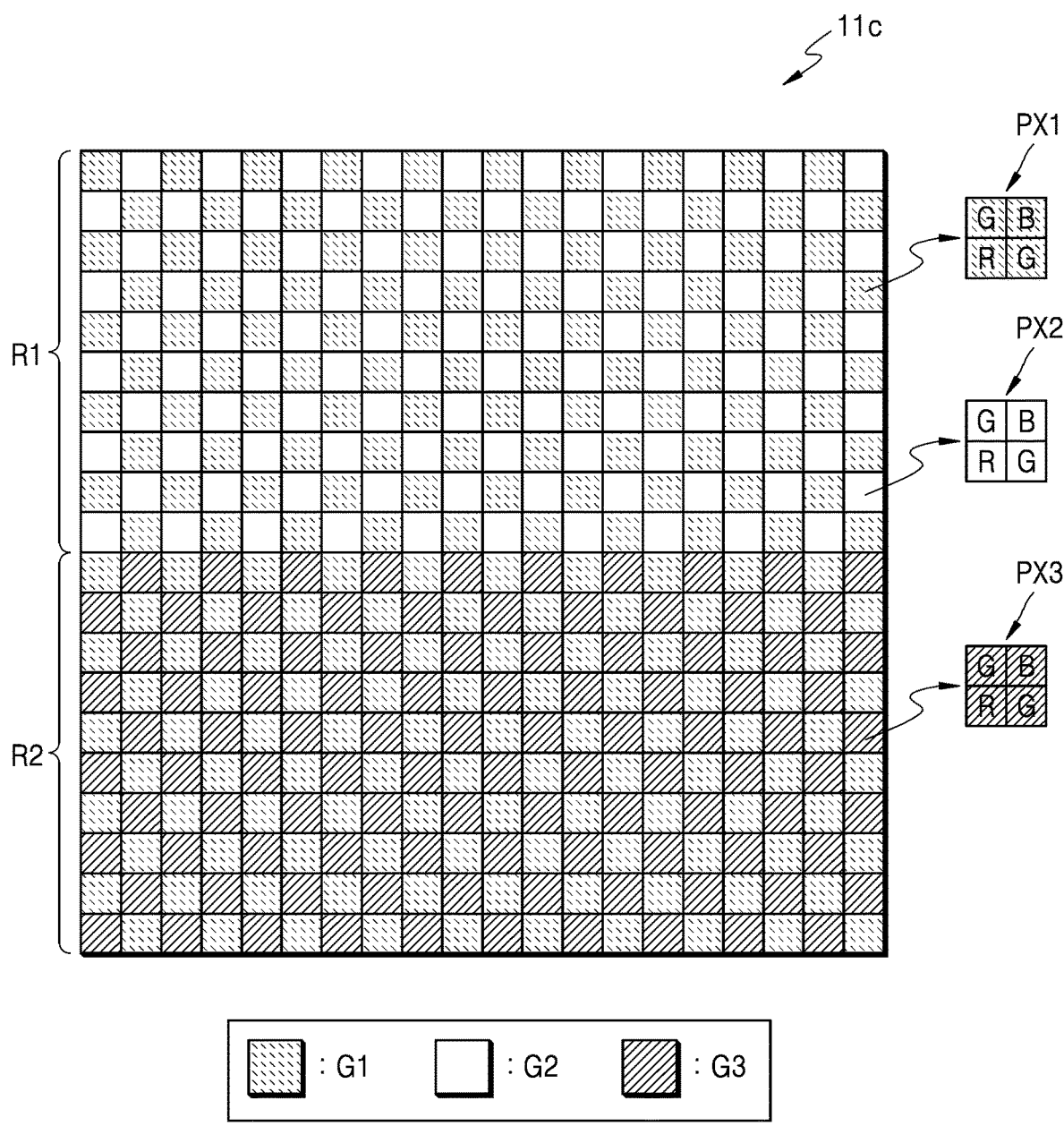
Figure 5D:
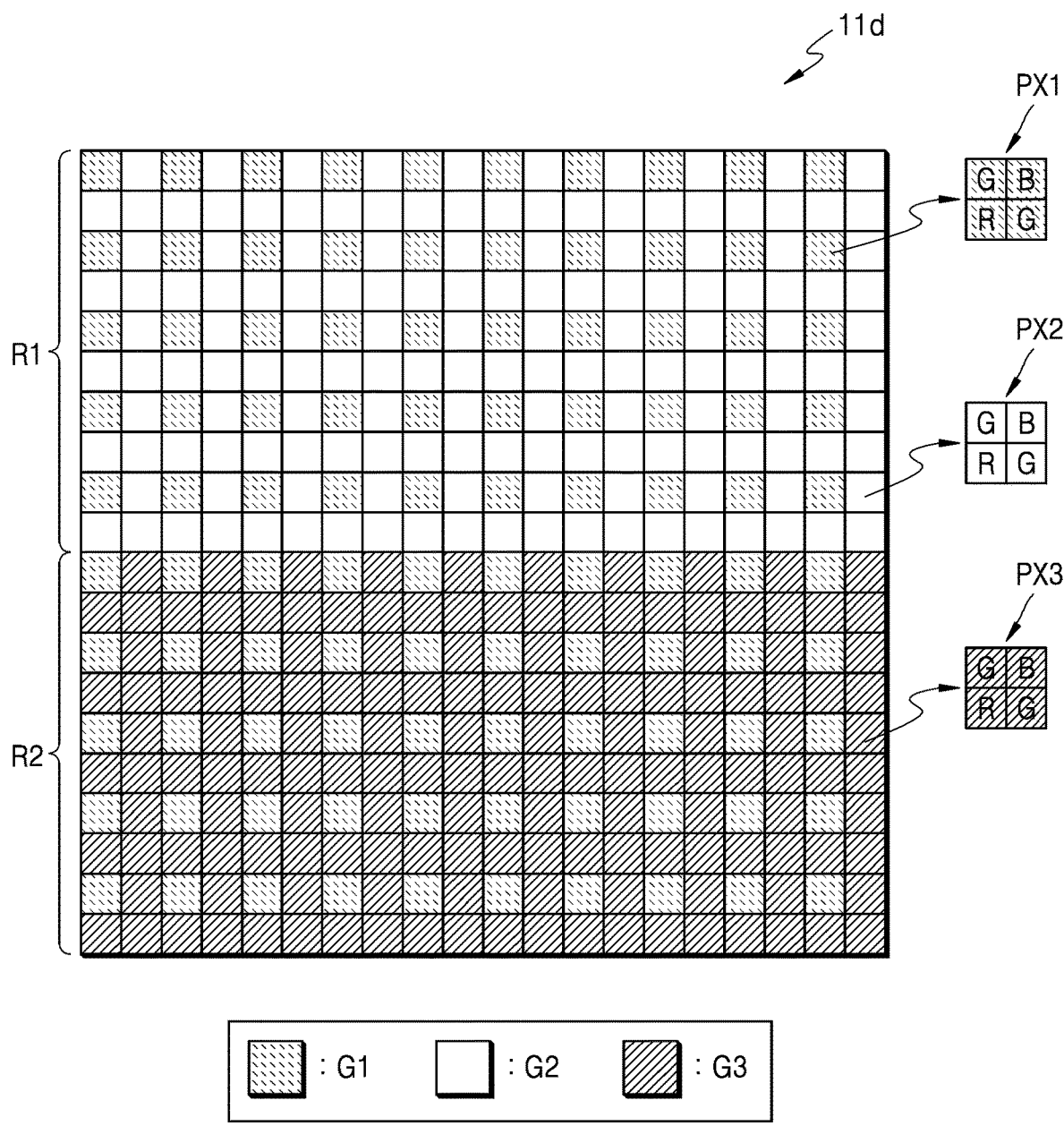

Referring to FIG. 5B, the pixel array 11*b* may be divided into a first region R1 and a second region R2. The signal processor 15 may generate a setting signal SET such that the second pixel group G2 has a short EIT in the first region R1 corresponding to the high illuminance and the third pixel group G3 has a long EIT in the second region R2 corresponding to the low illuminance. The first pixel group G1 may include pixels regularly distributed in the pixel array 11*b* independently of illuminance. For example, as shown in FIG. 5B, the first pixel group G1 may include rows having indices corresponding to multiples of 3 in the pixel array 11*b*.

Referring to FIG. 5C, the pixel array 11*c* may be divided into a first region R1 and a second region R2. The signal processor 15 may generate a setting signal SET such that the second pixel group G2 has a short EIT in the first region R1 corresponding to the high illuminance and the third pixel group G3 has a long EIT in the second region R2 corresponding to the low illuminance. The first pixel group G1 may include pixels regularly distributed in the pixel array 11b independently of illuminance. For example, as shown in FIG. 5C, the first pixel group G1 may include pixels disposed at positions corresponding to a grid at equal intervals.

Referring to FIG. 5D, the pixel array 11d may be divided into a first region R1 and a second region R2. The signal processor 15 may generate a setting signal SET such that the second pixel group G2 has a short EIT in the first region R1 corresponding to the high illuminance and the third pixel group G3 has a long EIT in the second region R2 corresponding to the low illuminance. The first pixel group G1 may include pixels regularly distributed in the pixel array 11b independently of illuminance. For example, as shown in FIG. 5D, the first pixel group G1 may include pixels disposed at positions corresponding to an equally spaced grid, and may correspond to a pattern different from that of the first pixel group G1 of FIG. 5C.

Figure 5E:
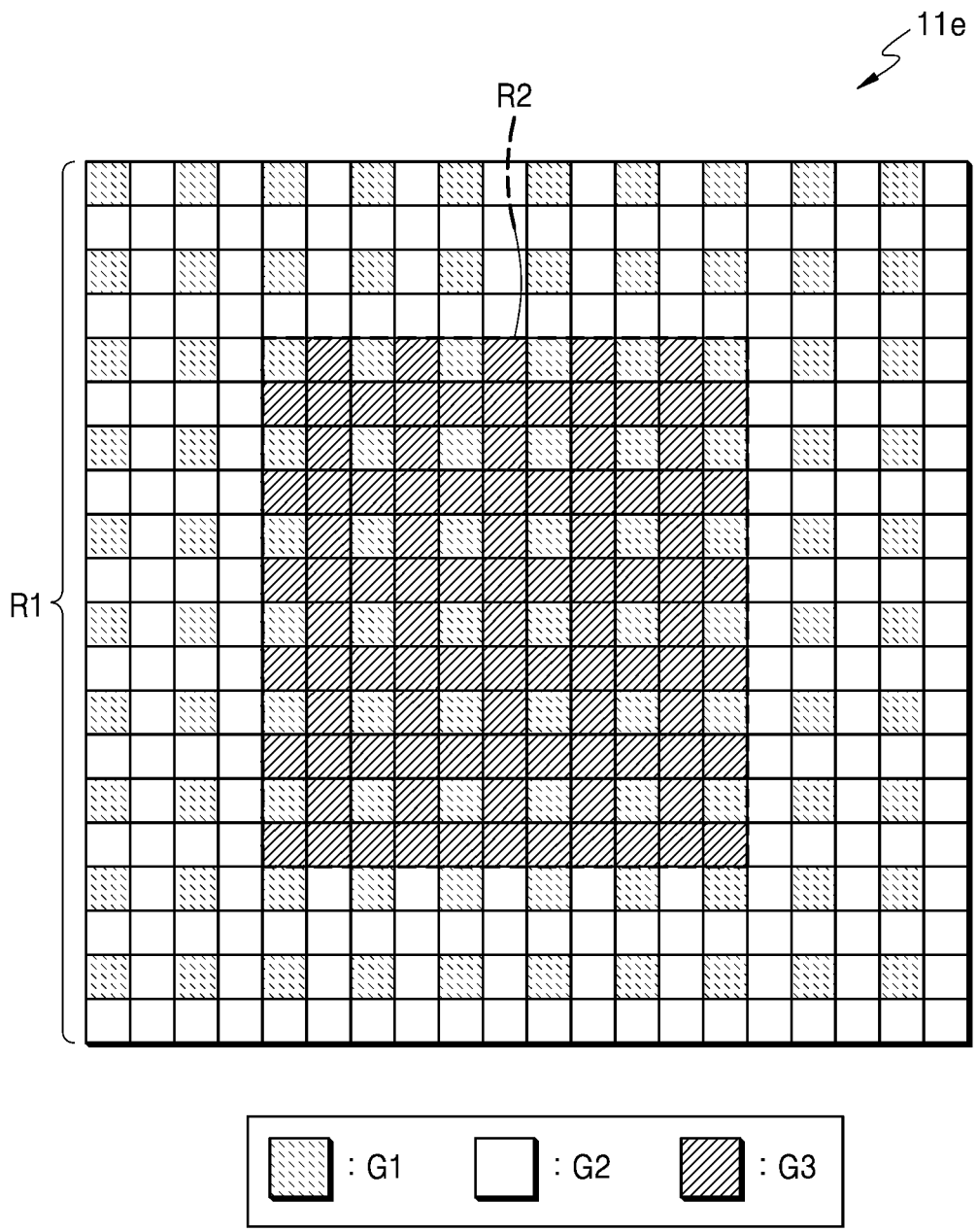

Referring to FIG. 5E, the pixel array 11e may be divided into a first region R1 and a second region R2. Unlike the pixel arrays 11a to 11d of FIGS. 5A to 5D that are divided into a first region R1 and a second region R2 in a row unit, the pixel array 11e of FIG. 5E may be divided into regions corresponding to arbitrary shapes according to illuminance. For example, as shown in FIG. 5E, the pixel array 11e may be divided into a second region R2 that is in the center and corresponds to low illuminance, and a first region R1 that surrounds the second region R2 and corresponds to high illuminance. The signal processor 15 may generate a setting signal SET such that the first region R1 includes a pixel having a short EIT and the second region R2 includes a pixel having a long EIT. For example, the signal processor 15 may generate a setting signal SET such that the second pixel group G2 has a short EIT in the first region R1 and the third pixel group G3 has a long EIT in the second region R2. As shown in FIG. 5E, the first pixel group G1 corresponding to the reference pixel group may include pixels disposed at positions corresponding to a grid at equal intervals.

Figure 6A:
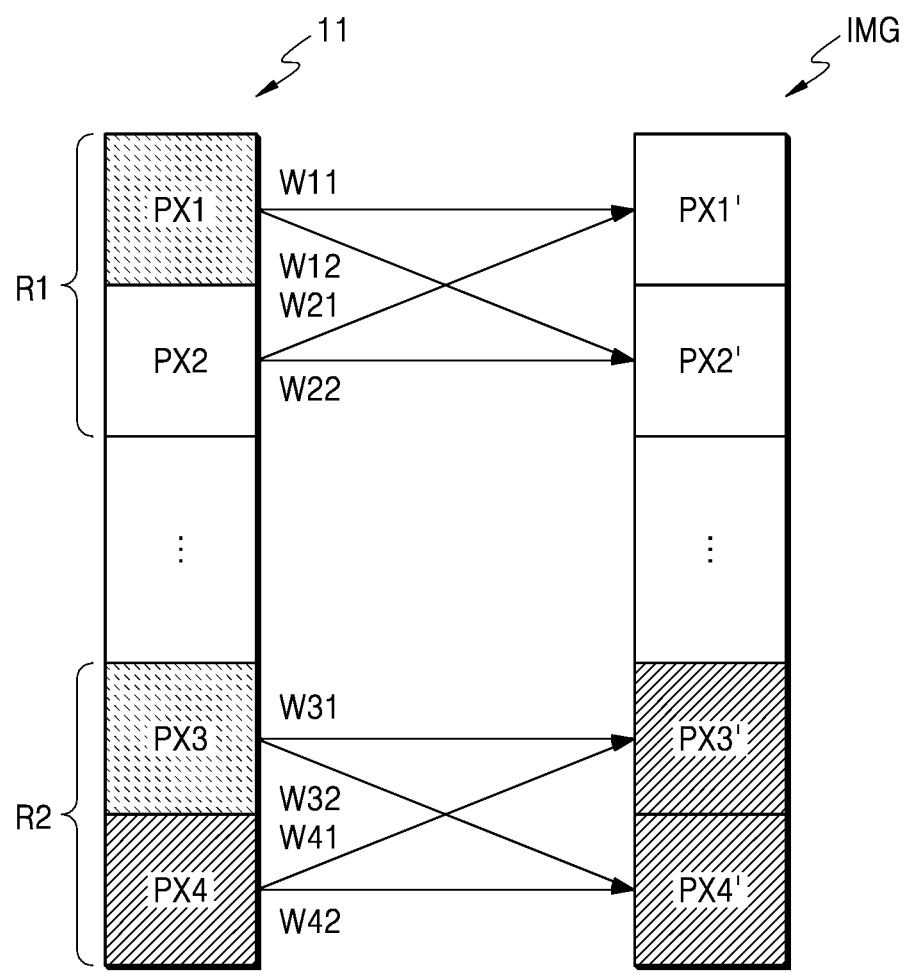
FIGS. 6A and 6B are diagrams illustrating examples of operation of an image sensor according to embodiments.
Figure 6B:
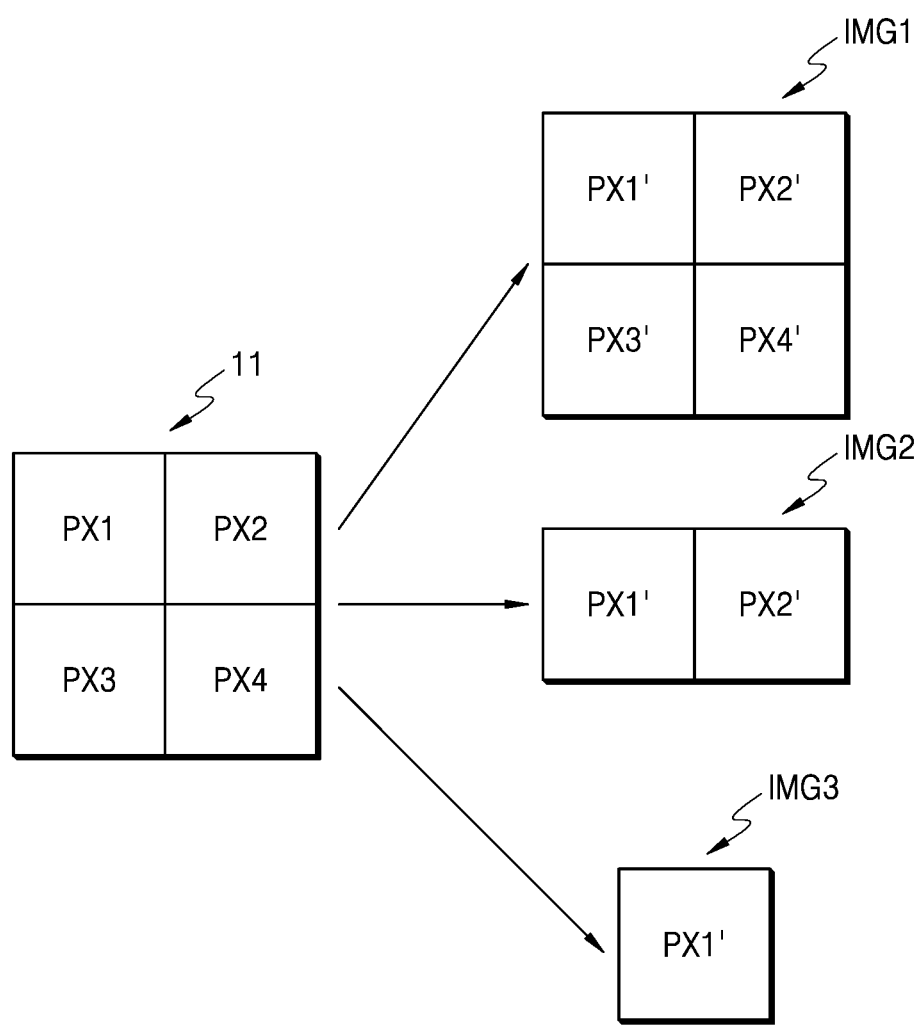

FIGS. 6A and 6B are diagrams illustrating examples of operation of the image sensor 10 according to embodiments. In detail, FIGS. 6A and 6B show examples of operations performed by the signal processor 15 of FIG. 1. As described above, the signal processor 15 may perform operations on values of the digital signal DSIG corresponding to the pixel groups, and may generate image data IMG based on the operation result. Hereinafter, FIGS. 6A and 6B are described with reference to FIG. 1.

Referring to the left side of FIG. 6A, the pixel array 11 may include a first region R1 corresponding to high illuminance and a second region R2 corresponding to low illuminance. The first region R1 may include a first pixel PX1 as a reference pixel and a second pixel PX2 as an adaptive pixel. The second region R2 may include a third pixel PX3 as a reference pixel and a fourth pixel PX4 as an adaptive pixel. As described above with reference to FIGS. 5A to 5E, the first pixel PX1 and the third pixel PX3 may be included in the reference pixel group and may have a fixed EIT (e.g., 11 ms). Also, the second pixel PX2 of the first region R1 may have an EIT that is shorter than or equal to that of the reference pixel, and the fourth pixel PX4 of the second region R1 may have an EIT that is longer than or equal to that of the reference pixel.

In some embodiments, the signal processor 15 may calculate a weighted sum of values of the digital signal DSIG. For example, as shown in FIG. 6A, the product of the value of the digital signal DSIG corresponding to the first pixel PX1 of the pixel array 11 and the weight W11 and the product of the value of the digital signal DSIG corresponding to the second pixel PX2 and the weight W21 may be summed, and the value of the first pixel PX1' of the image data IMG may correspond to the calculated weighted sum. The product of the value of the digital signal DSIG corresponding to the first pixel PX1 of the pixel array 11 and the weight W12 and the product of the value of the digital signal DSIG corresponding to the second pixel PX2 and the weight W22 may be summed, and the value of the second pixel PX2' of the image data IMG may correspond to the calculated weighted sum. The product of the value of the digital signal DSIG corresponding to the third pixel PX3 of the pixel array 11 and the weight W31 and the product of the value of the digital signal DSIG corresponding to the fourth pixel PX4 and the weight W41 may be summed, and the value of the third pixel PX3' of the image data IMG may correspond to the calculated weighted sum. The product of the value of the digital signal DSIG corresponding to the third pixel PX3 of the pixel array 11 and the weight W32 and the product of the value of the digital signal DSIG corresponding to the fourth pixel PX4 and the weight W42 may be summed, and the value of the fourth pixel PX4' of the image data IMG may correspond to the calculated weighted sum. In some embodiments, differently as shown in FIG. 6A, a weighted sum of values corresponding to three or more adjacent pixels in the pixel array 11 may be calculated as the image data IMG.

In some embodiments, weights may be defined based on EIT. For example, the EIT of the first pixel PX1 may be longer than or equal to the EIT of the second pixel PX2, and accordingly, the weight (e.g., W11) of the first pixel PX1 may be smaller than the weight (e.g., W21) of the second pixel PX2. In addition, the EIT of the third pixel PX3 may be shorter than or equal to the EIT of the fourth pixel PX4, and accordingly, the weight (e.g., W31) of the third pixel PX3 may be greater than the weight (e.g., W41) of the fourth pixel.

In some embodiments, the weights may be defined based on resolution or sharpness of the image data IMG. For example, the weight W11 and the weight W12 of the first pixel PX1 may be different, and/or the weight W21 and the weight W22 of the second pixel PX2 may be different. Accordingly, the first pixel PX1' and the second pixel PX2' of the image data IMG may have different values, respectively. Also, the weight W31 and the weight W32 of the third pixel PX3 may be different, and/or the weight W41 and the weight W42 of the fourth pixel PX4 may be different. Accordingly, the third pixel PX3' and the fourth pixel PX4' of the image data IMG may have different values, respectively.

As described above, the signal processor 15 may perform binning on pixels each having different EITs, and accordingly, as described below with reference to FIGS. 7A to 8B, the image sensor 10 may have improved performance.

Referring to FIG. 6B, the resolution of the image data IMG may be changed by binning. For example, as shown in FIG. 6B, first to third image data IMG1 to IMG3 having different resolutions may be generated from the first to fourth pixels PX1 to PX4 adjacent to each other in the pixel array 11. Like the image data IMG of FIG. 6A, the first image data IMG1 may have a resolution corresponding to the pixel array 11. In some embodiments, the values of the first pixel PX1' and the third pixel PX3' of the first image data IMG1 may be generated by binning the first pixel PX1 and the third pixel PX3 of the pixel array 11 and the values of the first pixel PX1' and the third pixel PX3' of the first image data IMG1 may be generated by binning the second pixel PX2 and the fourth pixel PX4 of the pixel array 11. In some embodiments, the values of the first to fourth pixels PX1' to PX4' of the first image data IMG1 may be generated by binning with respect to the first to fourth pixels PX1 to PX4 of the pixel array 11.

The value of the first pixel PX1' of the second image data IMG2 may be generated by binning the first pixel PX1 and the third pixel PX3 of the pixel array 11, and the value of the second pixel PX2' of the second image data IMG2 may be generated by binning the second pixel PX2 and the fourth pixel PX4 of the pixel array 11. Accordingly, the second image data IMG2 may correspond to an image having a lower resolution than that of the first image data IMG1. Also, the value of the first pixel PX1' of the third image data IMG3 may be generated by binning the first to fourth pixels PX1 to PX4 of the pixel array 11. Accordingly, the third image data IMG3 may correspond to an image having a lower resolution than that of the first image data IMG1 and the second image data IMG2.

Figure 7A:
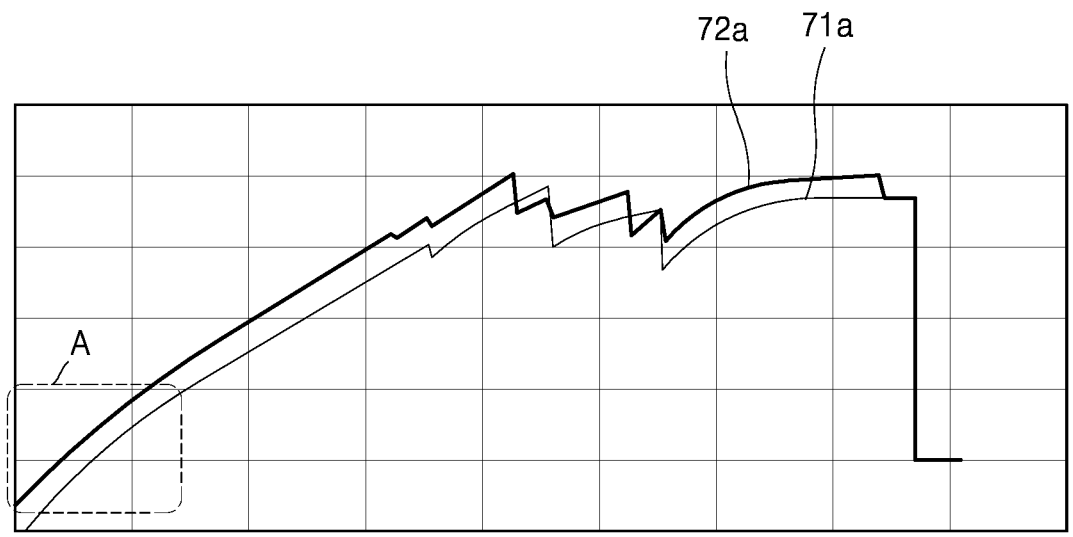
FIGS. 7A and 7B show SNR-HDR graphs of an image sensor according to embodiments.
Figure 7B:
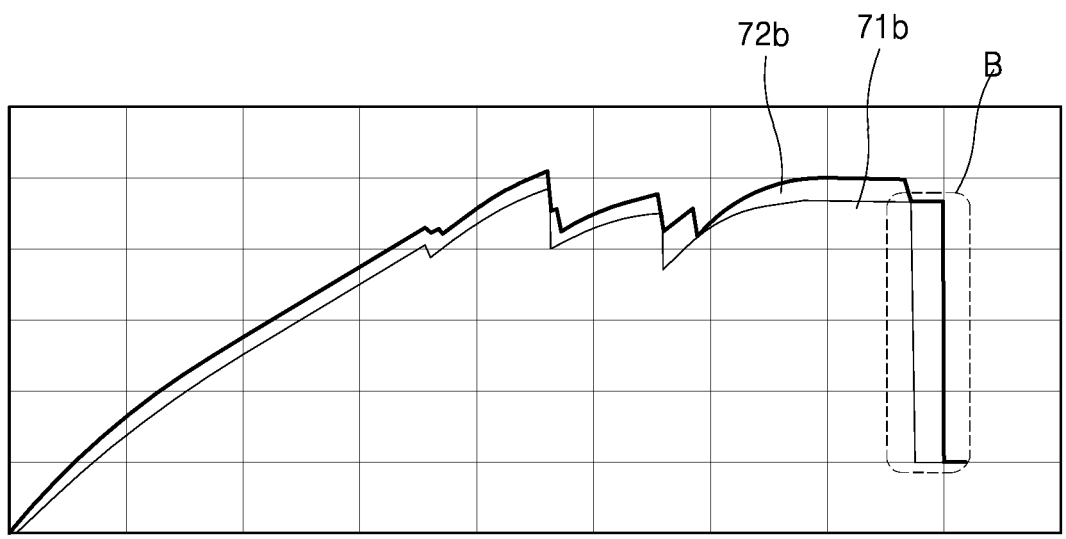

FIGS. 7A and 7B show SNR-HDR graphs of the image sensor 10 according to embodiments. In detail, the graph of FIG. 7A shows the SNR-HDR graph of the image sensor 10 in a low-illuminance region, and the graph of FIG. 7B shows an SNR-HDR graph of the image sensor 10 in a high illuminance region. Hereinafter, FIGS. 7A and 7B are described with reference to FIG. 6A.

Referring to FIG. 7A, a first curve 71a in FIG. 7A may correspond to a case in which the same EIT is applied to all pixels of the pixel array 11, and a second curve 72a may correspond to a case in which different EITs are applied to pixel groups in a low-illuminance region, as described above. As shown in portion A of FIG. 7A, the second curve 72a may have a higher SNR than the first curve 71a at low illuminance, and the image sensor 10 may therefore provide an improved low illuminance SNR. For example, when the EIT of the third pixel PX3 is 11 ms and the EIT of the fourth pixel PX4 is 22 ms in the second region R2 of FIG. 6A corresponding to low illuminance, an SNR of about 6 dB may increase for the fourth pixel PX4 due to the EIT that is two times as long as the EIT of the third pixel PX3, and when the weights W31, W32, W41 and W42 are all equal, by binning, an SNR of about 5 dB may be increased as shown in [Equation 1] below.

$$PX3 \text{ signal}: S_3, PX3 \text{ noise}: N_3 \; SNR =$$
$$20\log\left(\frac{S}{N}\right) = 20\log\left(\frac{4}{\sqrt{5}} \times \frac{S_3}{N_3}\right) \cong 20\log\left(\frac{S_3}{N_3}\right) + 5.05 \text{ dB}$$ [Equation 1]

$$PX4 \text{ signal}: S_4 = 2S_3, PX4 \text{ noise}: N_4 = N_3$$

$$\text{Normalization}: \overline{S}_4 = \frac{S_4}{2} = S_3, \overline{N}_4 = \frac{N_4}{2} = \frac{N_3}{2}$$

$$\text{Weighted Sum}: S = \frac{1}{2}(S_3 + \overline{S}_4) = S_3$$

$$N = \frac{1}{2}\sqrt{N_3^2 + \left(\frac{\overline{N}_4}{2}\right)^2} = \frac{\sqrt{5}}{4}N_3$$

In [Equation 1], normalization may be performed due to different EITs, and in some embodiments, normalization may be reflected in weights.

Referring to FIG. 7B, the first curve 71b represents a case in which the same EIT is applied to all pixels of the pixel array 11, and the second curve 72b may correspond to a case in which different EITs are applied to pixel groups in a high illuminance region, as described above. As shown in portion B of FIG. 7B, the second curve 72b may have an extended HDR in a higher illuminance region than the first curve 71b, and the image sensor 10 may therefore provide improved HDR. For example, when the EIT of the first pixel PX1 is 11 ms and the EIT of the second pixel PX2 is 5.5 ms in the first region R1 of FIG. 6A corresponding to high illuminance, the highest illuminance acceptable to the second pixel PX2 may increase, and HDR may be extended by 6 dB as shown in [Equation 2] below.

$$SNR = 20\log\left(\frac{2 \times \text{highest illumination}}{\text{lowest illumination}}\right) \cong$$
$$20\log\left(\frac{\text{highest illumination}}{\text{lowest illumination}}\right) + 6 \text{ dB}$$ [Equation 2]

Figure 8A:
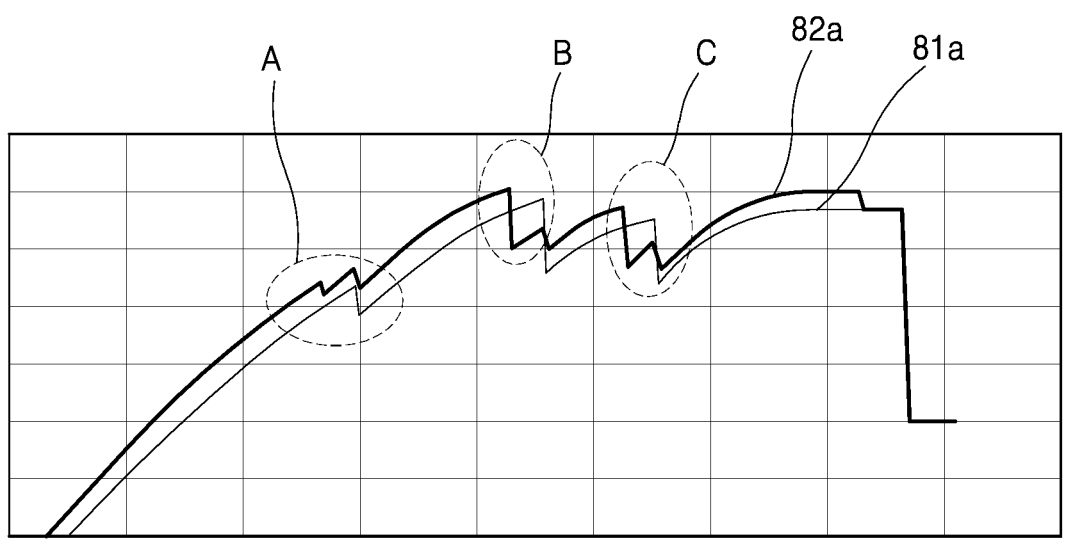
FIGS. 8A and 8B show SNR-HDR graphs of an image sensor according to embodiments.
Figure 8B:
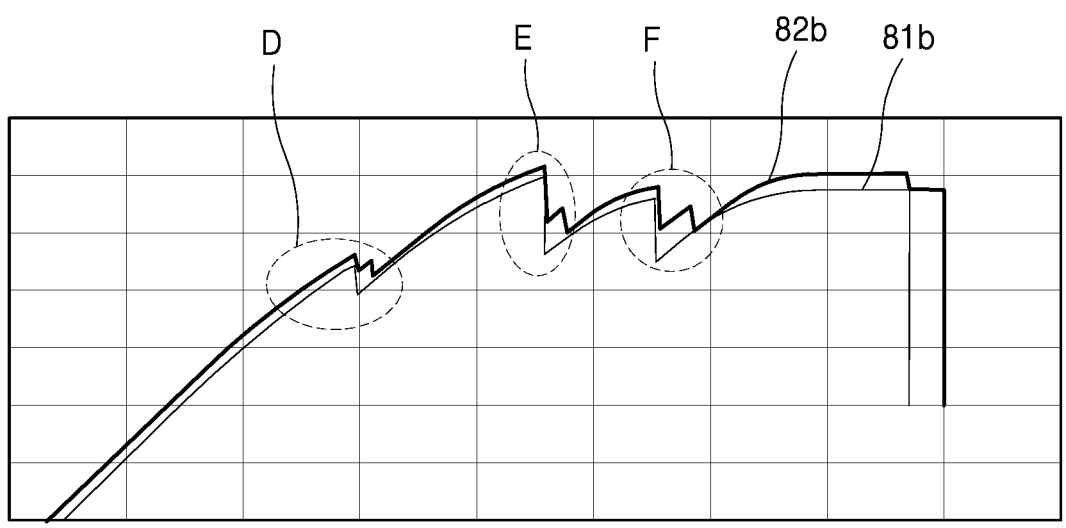

FIGS. 8A and 8B show SNR-HDR graphs of the image sensor 10 according to embodiments. In detail, the graph of FIG. 8A shows an SNR-HDR graph of the image sensor 10 in a high temperature state in a low illuminance region, and the graph of FIG. 8B shows an SNR-HDR graph of the image sensor 10 in a high temperature state in a high illuminance region. Hereinafter, FIGS. 8A and 8B are described with reference to FIG. 1.

The image sensor 10 may be required to have a higher SNR at the image coupling point, as described above with reference to FIG. 3, and in particular, the SNR of the image coupling point may deteriorate when the image sensor 10 is at a high temperature. As described above, pixels each having different EITs may be binned, and when a noise difference between the pixels is large, an SNR of about 5 dB may increase with respect to a pixel with high noise. Also, pixels each having different EITs may be binned, and if noise is similar in the pixels, an SNR of about 3 dB may increase. Accordingly, like dark signal non-uniformity (DSNU), an SNR dip occurring between different intervals may be greatly improved by binning pixels each having different EITs. That is, an effect of arranging an additional section in a section in which the SNR is weak may occur, and as a result, an effect of improving the overall SNR may occur.

Referring to FIG. 8A, a first curve 81a in FIG. 8A may correspond to a case in which the same EIT is applied to all pixels of the pixel array 11, and a second curve 82a may correspond to a case in which different EITs are applied to pixel groups in a low illuminance region, as described above. As shown in portions A, B and C of FIG. 8A, the second curve 82a may have a higher SNR than the first curve 81a at image coupling points, and the image sensor 10 may provide improved SNRs at image coupling points.

Referring to FIG. 8B, the first curve 81b in FIG. 8B may correspond to a case in which the same EIT is applied to all pixels of the pixel array 11, and the second curve 82b may correspond to a case in which different EITs are applied to pixel groups in a high illuminance region, as described above. As shown in portions D, E and F of FIG. 8B, the second curve 82b may have a higher SNR than the first curve 81b at image coupling points, and the image sensor 10 may provide improved SNRs at image coupling points.

Figure 9:
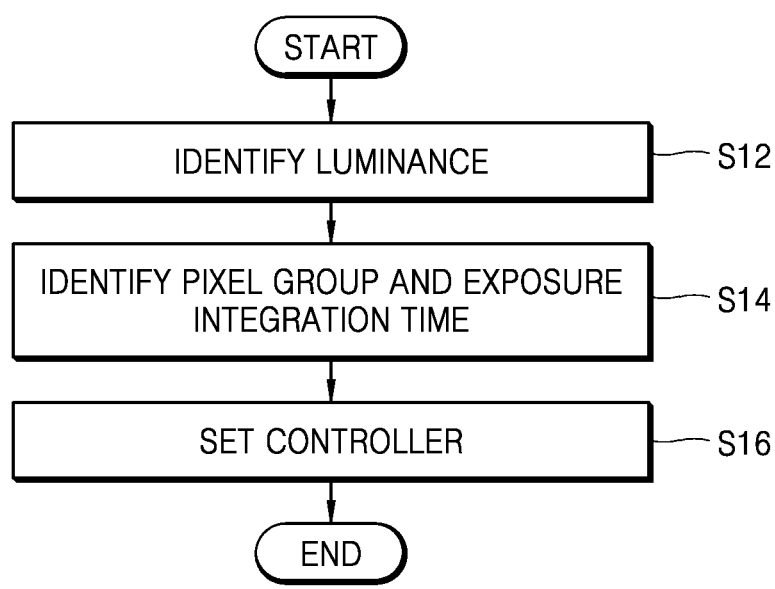
FIG. 9 is a flowchart illustrating a method performed by an image sensor according to an embodiment.

FIG. 9 is a flowchart illustrating a method performed by the image sensor 10 according to an embodiment. As shown in FIG. 9, the method performed by the image sensor 10 may include a plurality of operations S12, S14, and S16. In some embodiments, the method of FIG. 9 may be performed by the signal processor 15 of FIG. 1 before operation S20 of FIG. 4 is performed. Hereinafter, FIG. 9 is described with reference to FIG. 1.

Referring to FIG. 9, the illuminance may be identified in operation S12. For example, the signal processor 15 may identify the illuminance of the subject based on the digital signal DSIG. In some embodiments, the signal processor 15 may identify the illuminance based on values of the digital signal DSIG corresponding to all of the plurality of pixels included in the pixel array 11. In some embodiments, the signal processor 15 may identify the illuminance based on the values of the digital signal DSIG corresponding to some (e.g., pixels corresponding to the equally spaced grid) of the plurality of pixels included in the pixel array 11.

In operation S14, a pixel group and an EIT may be identified. For example, the signal processor 15 may compare the illuminance identified in operation S12 with at least one threshold value. The signal processor 15 may define pixels included in the same illuminance range among two or more illuminance ranges defined by at least one threshold as one region. The signal processor 15 may divide the pixel array 11 into two or more regions, and may identify a pixel group in each of the divided regions. In some embodiments, as described above with reference to FIGS. 5A to 5D, the pixel array 11 may include a reference pixel group, and the signal processor 15 may identify a pixel group including pixels excluding the reference pixel group in the divided region. In some embodiments, the signal processor 15 may refer to a lookup table that stores a plurality of pairs of an illuminance range and an EIT, and may identify an EIT corresponding to a group of pixels.

In operation S16, the controller 14 may be set. For example, the signal processor 15 may set the controller 14 based on the pixel group and EIT identified in operation S14. The signal processor 15 may generate a setting signal SET including information about the identified pixel group and EIT, and the controller 14 may control the driver 12 according to information included in the setting signal SET. Accordingly, the driver 12 may be driven such that the pixel group identified in operation S14 has the EIT identified in operation S14. Examples of operation S16 are described below with reference to FIGS. 10A and 10B.

Figure 10A:
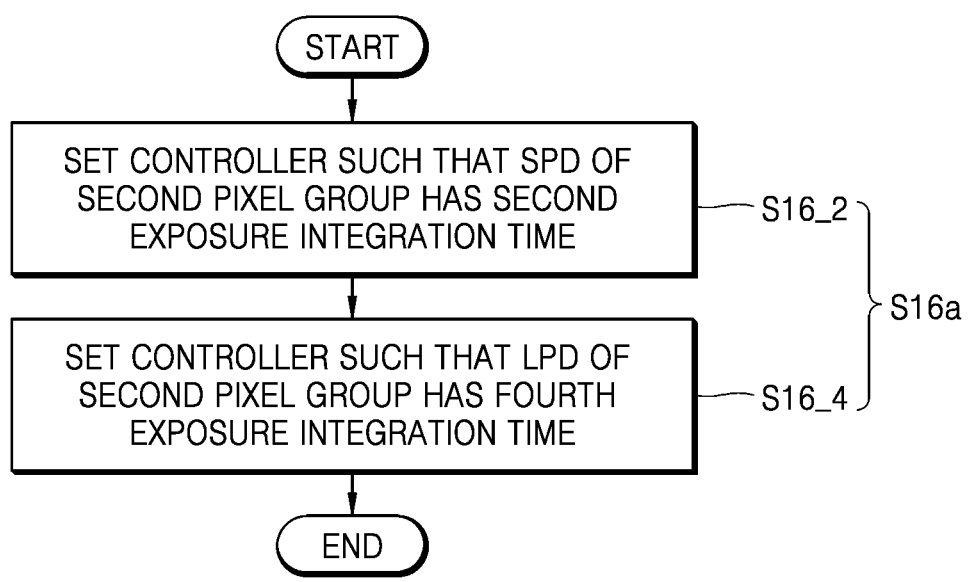
FIGS. 10A and 10B are flowcharts illustrating examples of a method performed by an image sensor according to embodiments.
Figure 10B:
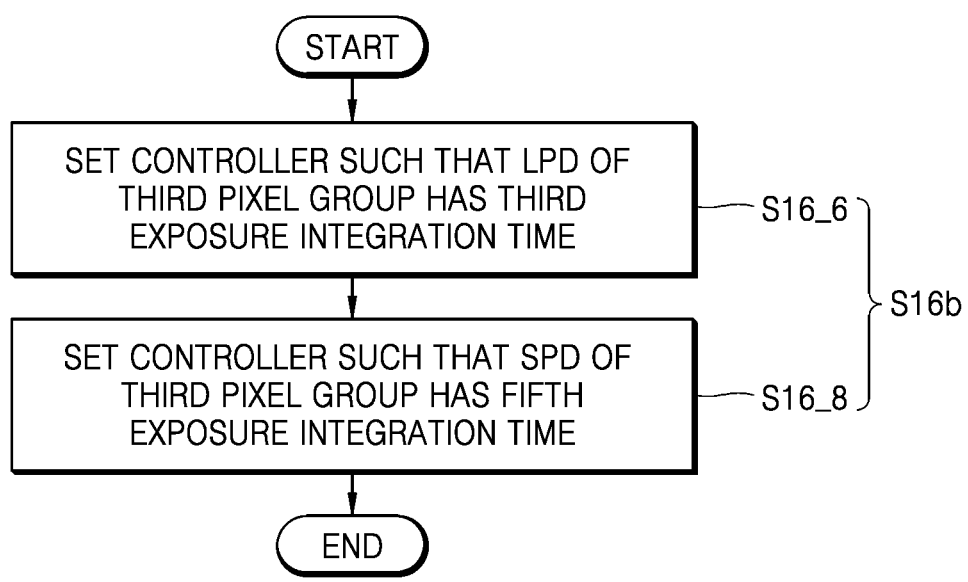

FIGS. 10A and 10B are flowcharts illustrating examples of a method performed by the image sensor 10 according to embodiments. In detail, the flowcharts of FIGS. 10A and 10B show examples of operation S16 of FIG. 9. As described above with reference to FIG. 9, in operation S16*a* of FIG. 10A and operation S16*b* of FIG. 10B, the signal processor 15 of FIG. 1 may set the controller 14. In some embodiments, operation S16 of FIG. 9 may include both operation S16*a* of FIG. 10A and operation S16*b* of FIG. 10B. In FIGS. 10A and 10B, it is assumed that the second pixel group and the third pixel group are the second pixel group G2 and the third pixel group G3 of FIGS. 5A to 5D, and the first pixel group G1 has a fixed first EIT (e.g., 11 ms). Hereinafter, FIGS. 10A and 10B are described with reference to FIGS. 5A to 5D.

Referring to FIG. 10A, operation S16*a* may include operations S16_2 and S16_4. In operation S16_2, the controller 14 may be set such that the small photodiode SPD of the second pixel group G2 has the second EIT. The second pixel group G2 may be included in the first region R1 corresponding to high illuminance, and accordingly, the second EIT (e.g., 5.5 ms) may be shorter than or equal to the first EIT (e.g., 11 ms) of the first pixel group G1. As described above with reference to FIG. 2B, the pixel may include a small photodiode SPD and a large photodiode LPD, and the signal processor 15 may set the controller 14 so that the small photodiode SPD of the pixel included in the second pixel group G2 has a second EIT shorter than or equal to the first EIT. Accordingly, the image sensor 10 may provide extended HDR.

In operation S16_4, the controller 14 may be set such that the large photodiode LPD of the second pixel group G2 has a fourth EIT. The second pixel group G2 may be included in the first region R1 corresponding to high illuminance, and accordingly, in operation S16_2, the small photodiode SPD of the second pixel group G2 may be set to a second EIT shorter than or equal to the first EIT, and in operation S16_4, the large photodiode LPD of the second pixel group G2 may have a fourth EIT (e.g., 9 ms or 11 ms) longer than or equal to the second EIT. Accordingly, as described below with reference to FIG. 11A, degradation of SNR that may occur when a dark subject is imaged in a high illuminance region may be prevented.

Referring to FIG. 10B, operation S16*b* may include operations S16_6 and S16_8. In operation S16_6, the controller 14 may be set such that the large photodiode LPD of the third pixel group G3 has a third EIT. The third pixel group G3 may be included in the second region R2 corresponding to low illuminance, and accordingly, the third EIT (e.g., 22 ms) may be longer than or equal to the first EIT (e.g., 11 ms) of the first pixel group G1. As described above with reference to FIG. 2B, the pixel may include a small photodiode SPD and a large photodiode LPD, and the signal processor 15 may set the controller 14 so that the large photodiode LPD of the pixel included in the third pixel group G3 has a third EIT that is equal to or longer than the first EIT. Accordingly, the image sensor 10 may provide high SNR at low illuminance.

In operation S16_8, the controller 14 may be set such that the small photodiode SPD of the third pixel group G3 has a fifth EIT. The third pixel group G3 may be included in the second region R2 corresponding to low illuminance, and accordingly, in operation S16_6, the large photodiode LPD of the third pixel group G3 may be set to a third EIT that is longer than or equal to the first EIT, and in operation S16_8, the small photodiode SPD of the third pixel group G3 may have a fourth EIT (e.g., 5.5 ms, 9 ms, or 11 ms) shorter than or equal to the third EIT. Accordingly, as described below with reference to FIG. 11B, extended HDR may be provided even in a low illuminance region.

Figure 11A:
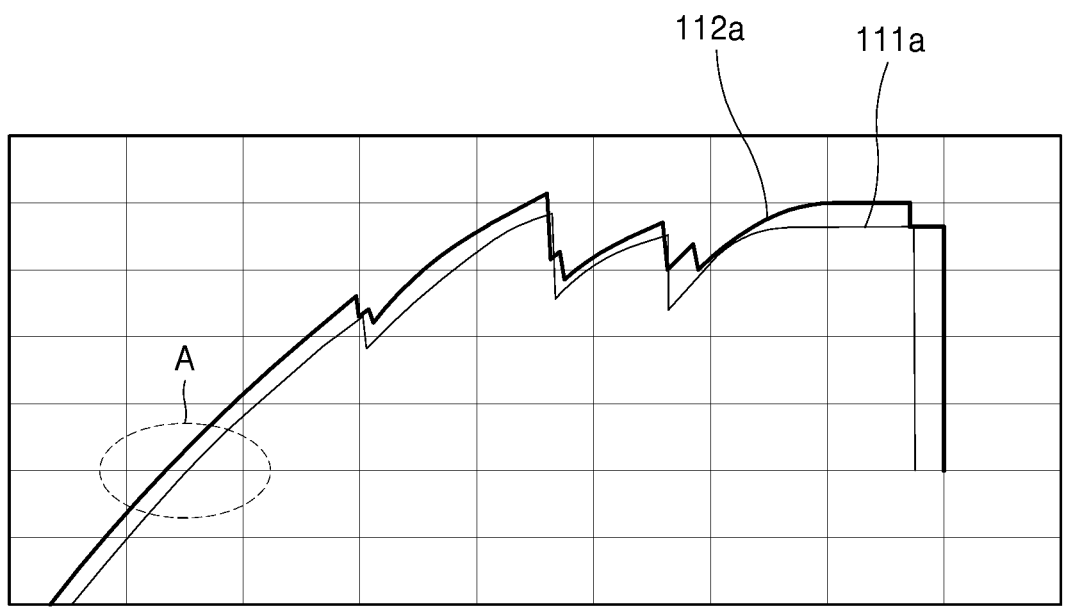
FIGS. 11A and 11B show SNR-HDR graphs of an image sensor according to embodiments.
Figure 11B:
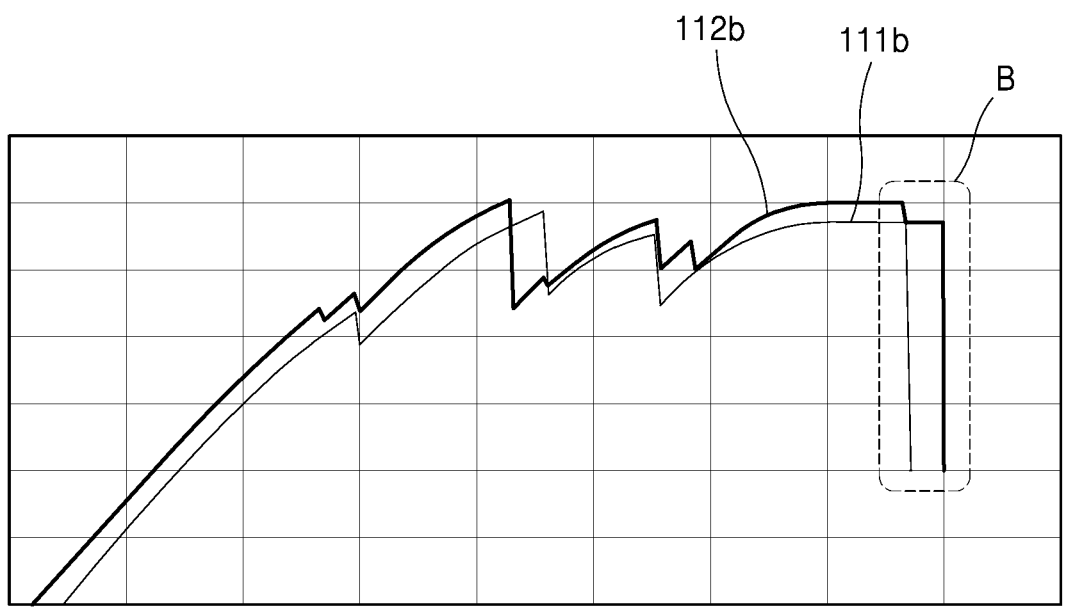

FIGS. 11A and 11B show SNR-HDR graphs of the image sensor 10 according to embodiments. In detail, FIG. 11A shows an SNR-HDR graph of the image sensor 10 performing operation S16*a* of FIG. 10A, and FIG. 11B shows an SNR-HDR graph of the image sensor 10 performing operation S16*b* of FIG. 10B. Hereinafter, FIGS. 11A and 11B are described with reference to FIGS. 5A to 5D.

Referring to FIG. 11A, the first curve 111*a* may correspond to a case in which the same EIT is applied to all pixels of the pixel array 11, and the second curve 112*a* may correspond to a case in which the small photodiode SPD of the second pixel group G2 has a second EIT shorter than or equal to the first EIT and the large photodiode LPD of the second pixel group G2 has a fourth EIT longer than or equal to the second EIT in the first region R1 corresponding to the high illuminance, as described above with reference to FIG. 11A. Accordingly, as shown in portion A of FIG. 11A, the second curve 112*a* may have a higher SNR than the first curve 111*a* at low illuminance, and the image data IMG may represent a dark subject well even in a high illuminance region.

Referring to FIG. 11B, the first curve 111b may correspond to a case in which the same EIT is applied to all pixels of the pixel array 11, and the second curve 112b may correspond to a case in which the large photodiode LOD of the third pixel group G3 has a third EIT longer than or equal to the first EIT and the small photodiode SPD of the third pixel group G3 has a fifth EIT shorter than or equal to the third EIT in the second region R2 corresponding to low illuminance, as described above with reference to FIG. 11B. Accordingly, as shown in portion B of FIG. 11B, the second curve 112b may have an extended HDR in a higher illuminance region than the first curve 111b, and the image data IMG may represent a bright subject well even in a low illuminance region.

Figure 12:
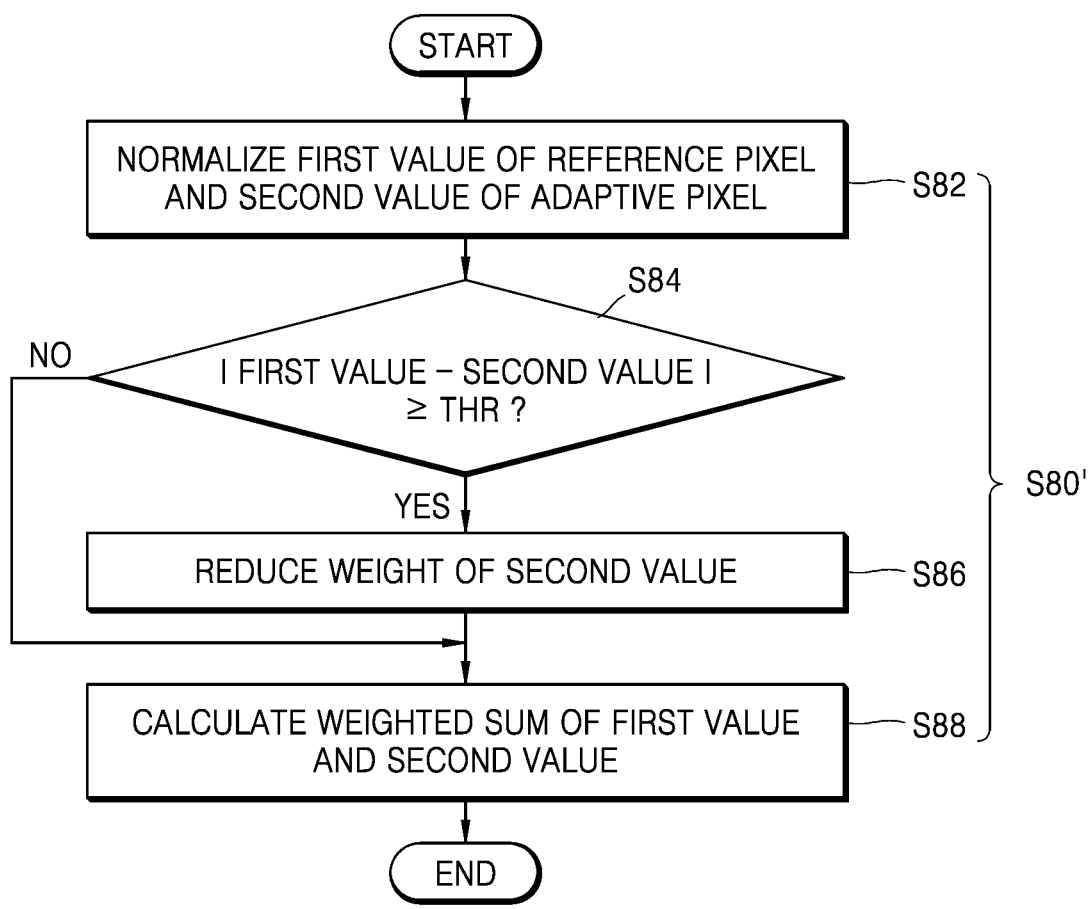
FIG. 12 is a flowchart illustrating a method performed by an image sensor according to an embodiment.

FIG. 12 is a flowchart illustrating a method performed by the image sensor 10 according to an embodiment. In detail, the flowchart of FIG. 12 shows an example of operation S80 of FIG. 4. As described above with reference to FIG. 4, the image data IMG may be generated by performing operations on the first value and the second value of the digital signal DSIG in operation S80' of FIG. 12. As shown in FIG. 12, operation S80' may include a plurality of operations S82, S84, S86, and S88. In some embodiments, operation S80' may be performed by the signal processor 15 of FIG. 1, and FIG. 12 is described below with reference to FIG. 1.

Referring to FIG. 12, the first value of the reference pixel and the second value of the adaptive pixel may be normalized in operation S82. As described above, the reference pixel and the adaptive pixel may each have different EITs. Accordingly, in an environment in which motion artifact and/or LED flicker occur, the reference pixel and the adaptive pixel may generate pixel signals having a large difference, respectively. Accordingly, the signal processor 15 may normalize the first value and the second value by compensating for the EIT difference to compare the first value of the reference pixel to the second value of the adaptive pixel as described below. For example, when the EIT of the adaptive pixel is ½ of the EIT of the reference pixel, the second value may be normalized by multiplying the second value by two.

In operation S84, a difference between the normalized first value and the normalized second value may be compared with a threshold value THR. For example, the signal processor 15 may calculate a difference between the normalized first value and the normalized second value in operation S82, and may determine whether the difference is equal to or greater than a threshold THR. When the difference between the first value and the second value is large, the signal processor 15 may consider that operation noise and/or LED flicker has occurred, and may increase the dependence on the reference pixel and decrease the dependence on the adaptive pixel. As shown in FIG. 12, when the difference between the first value and the second value is equal to or greater than the threshold value THR, operation S86 may be subsequently performed. On the other hand, when the difference between the first value and the second value is less than the threshold value THR, operation S86 may be omitted and operation S88 may be performed subsequently.

When operation noise and/or LED flicker occurs, the weight of the second value may be decreased in operation S86. For example, the signal processor 15 may decrease the weight of the second value to increase the dependence on the reference pixel and decrease the dependence on the adaptive pixel. In some embodiments, the signal processor 15 may set the weight of the second value to zero, and thus, the second value may be ignored. In some embodiments, the signal processor 15 may increase the weight of the first value while decreasing the weight of the second value.

In operation S88, a weighted sum of the first value and the second value may be calculated. For example, when operation noise and/or LED flicker does not occur, that is, when operation S88 is performed following operation S84, the signal processor 15 may calculate a weighted sum of the first value and the second value based on predefined weights. On the other hand, when operation noise and/or LED flicker occurs, that is, when operation S88 is performed following operation S86, the signal processor 15 may calculate a weighted sum of the first value and the second value based on the weights adjusted in operation S86. As a result, operation noise due to different EITs of pixels may be eliminated, and LED flicker mitigation (LFM) may be effectively achieved.

Figure 13A:
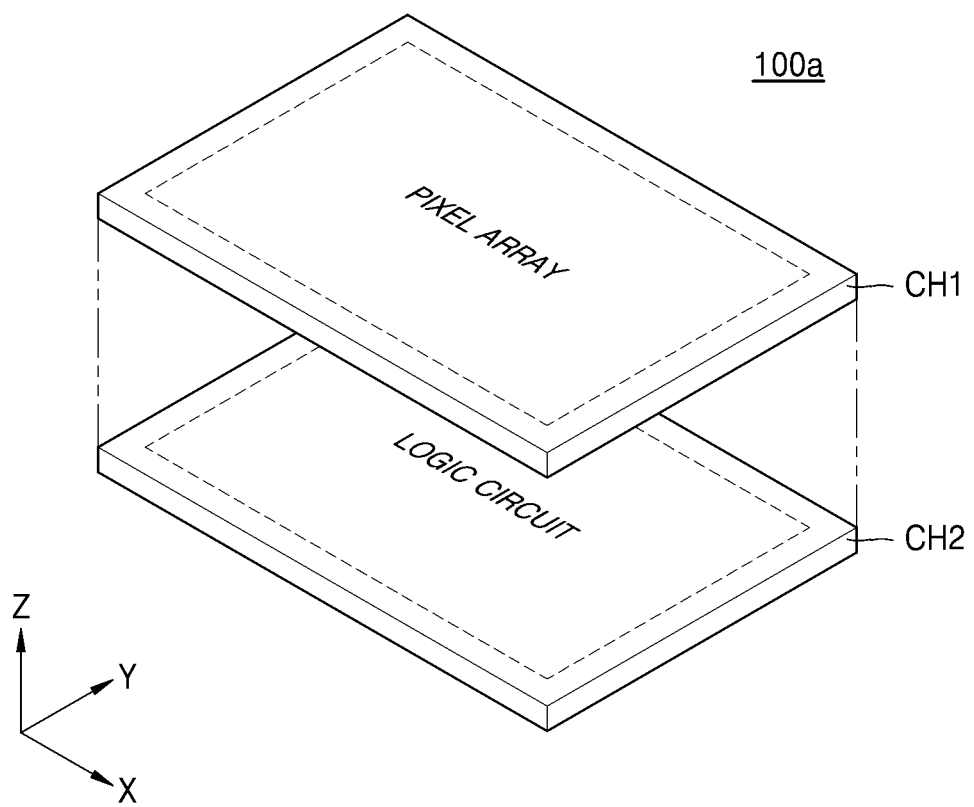
FIG. 13A is an exploded perspective view of an image sensor according to an embodiment.
Figure 13B:
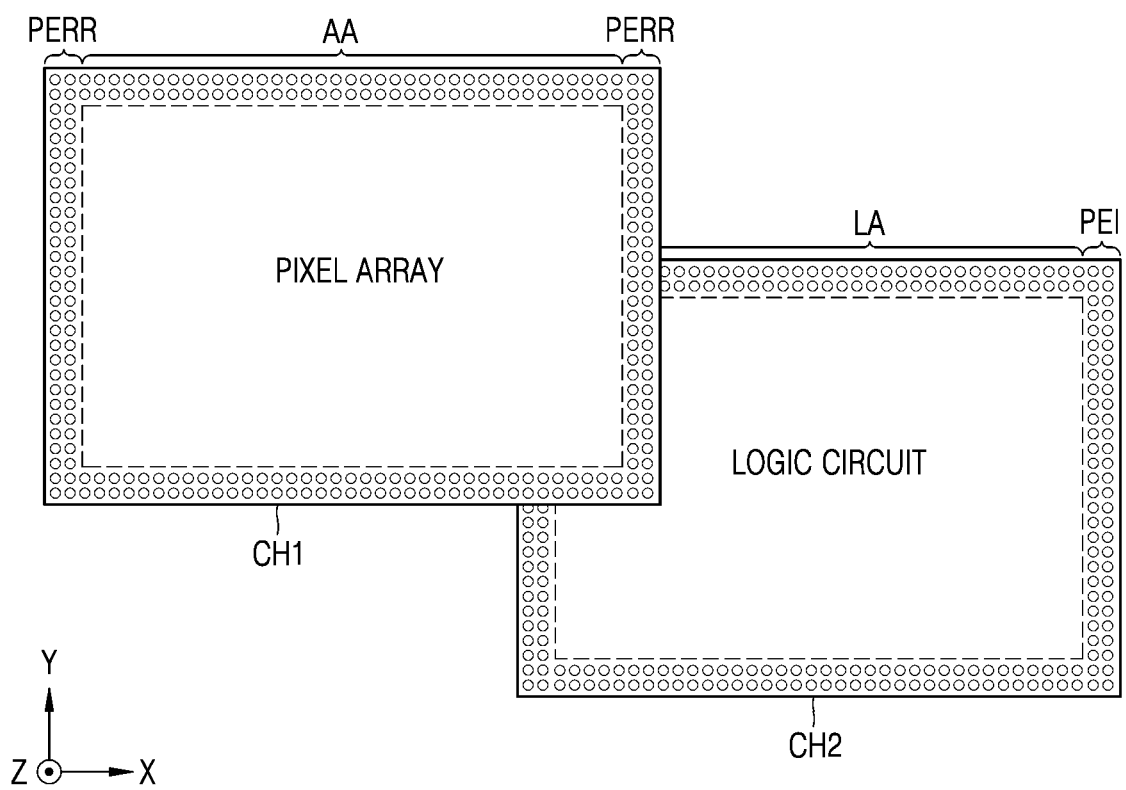
FIG. 13B is a plan view of an image sensor according to an embodiment.
Figure 13C:
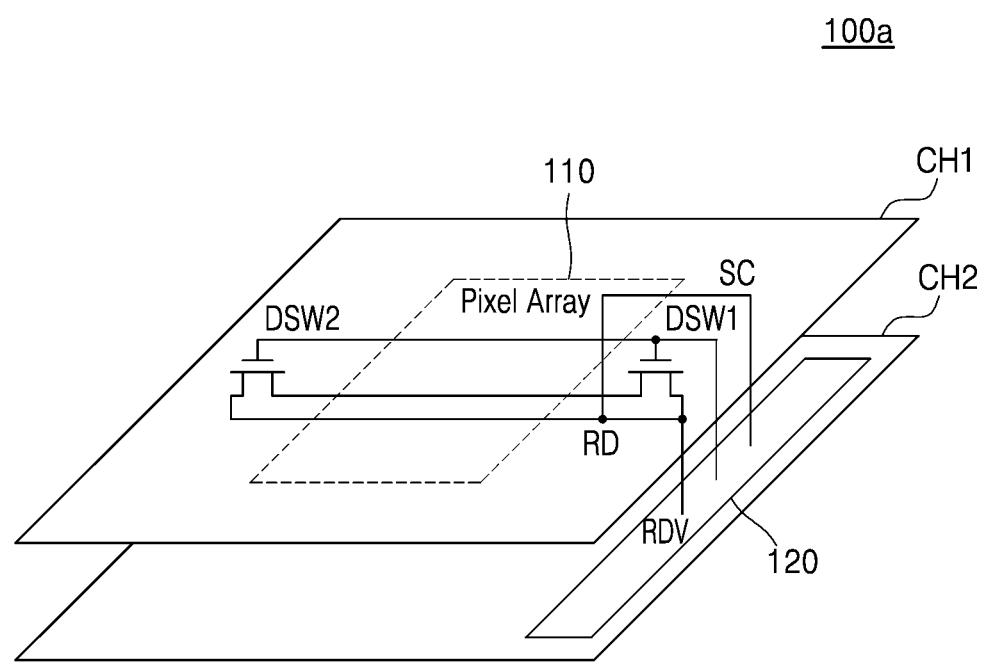
FIG. 13C is an exploded perspective view of an image sensor according to an embodiment.

FIG. 13A is an exploded perspective view of an image sensor, FIG. 13B is a planar view of an image sensor, and FIG. 13C is an exploded perspective view of an image sensor according to some embodiments.

With reference to FIGS. 13A and 13B, an image sensor 100a may have a structure in which a first chip CH1 and a second chip CH2 are stacked. Pixel cores (e.g., at least one photoelectric conversion element and pixel circuit) of each of the plurality of pixels PX included in the pixel array (11 of FIG. 1) may be formed in the first chip CH1, and the logic circuits, for example, the driver 12, the read-out circuit 13, the controller 14, and the signal processor 15, may be formed in the second chip CH2.

As illustrated in FIG. 13B, the first chip CH1 and the second chip CH2 may respectively include an active area AA and a logic area LA arranged in a central area, and further a peripheral region PERR and PEI arranged at the outer edge of the chip. In the pixel array of the first chip CH1, the photoelectric conversion element and the pixel circuits may be arranged in a 2D array structure. In the logic area LA of the second chip CH2, the logic circuit may be arranged.

In the peripheral region PERR and PEI of the first chip CH1 and the second chip CH2, through vias extending in a third direction (the Z direction) may be arranged. The first chip CH1 and the second chip CH2 may be electrically connected to each other through the through vias. In the peripheral region PERR of the first chip CH1, wirings and vertical contacts extending in the first direction (the X direction) or the second direction (the Y direction) may be further formed. In the wiring layer of the second chip CH2, a plurality of wiring lines extending in the first direction (the X direction) and the second direction (the Y direction) may be arranged and such wiring lines may be connected to the logic circuit. Although the first chip CH1 and the second chip CH2 are described as being electrically connected through the through vias, embodiments are not limited thereto, and the first chip CH1 and the second chip CH2 may be implemented in various combination structures, for example, a Cu—Cu bonding, a combination structure of a through via and a Cu pad, a combination structure of a through via and an external connection terminal, a combination structure by an integrated through via, etc.

With reference to FIG. 13C, the plurality of unit pixels PX included in the pixel array 110 may be embedded in an upper chip. For example, the upper chip may correspond to the first chip CH1 of FIG. 13A. The row driver 120 may be embedded in a lower chip. For example, the lower chip may correspond to the second chip CH2 of FIG. 13A. According to some embodiments, at least one control signal may be transmitted through the through vias. For example, the control signal to turn on the first switch DSW1 may be electrically transmitted through the through via from the lower second chip CH2 to the upper first chip CH1.

Figure 14:
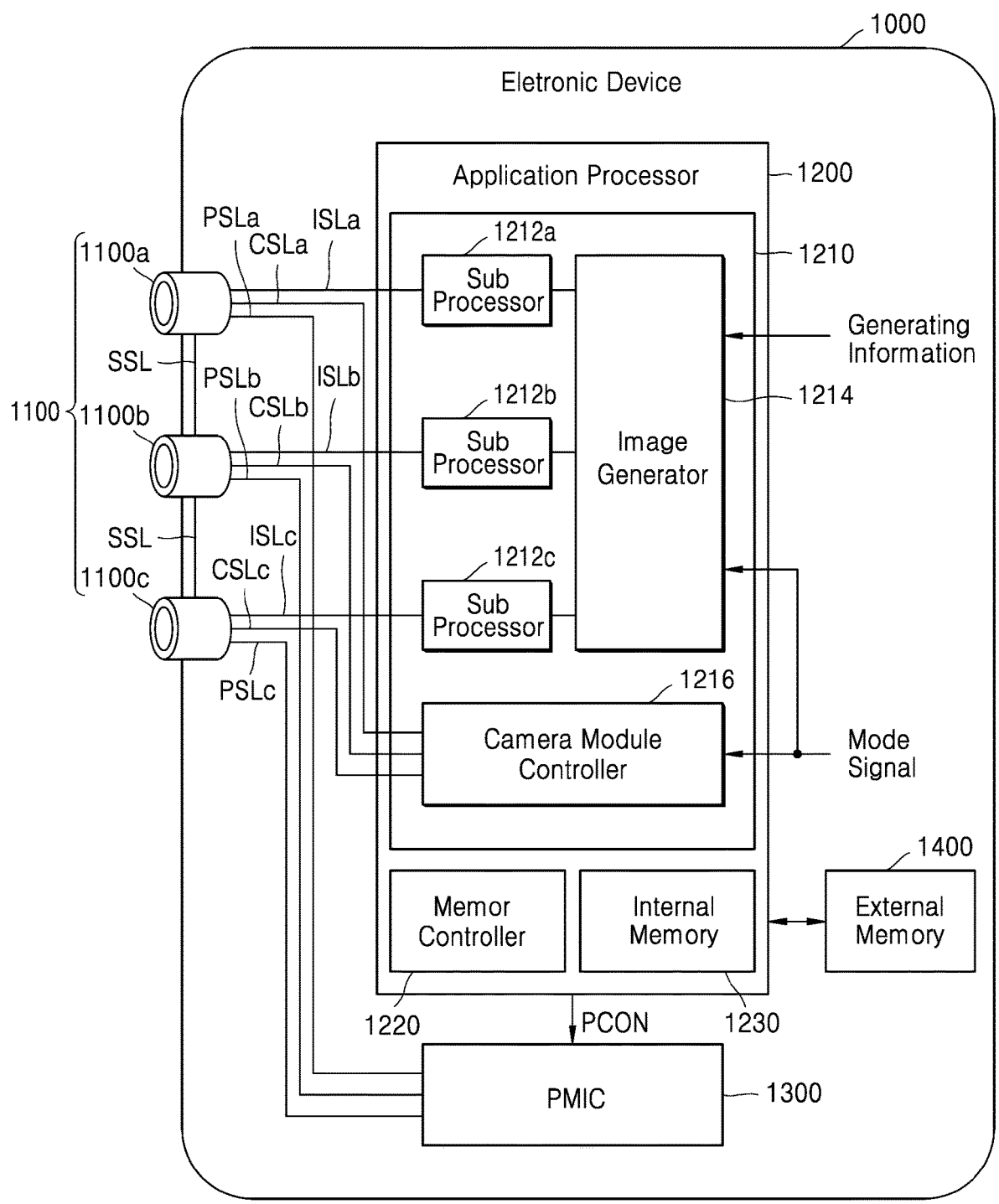
FIG. 14 is a block diagram illustrating an electronic device including a multi-camera module according to an embodiment.
Figure 15:
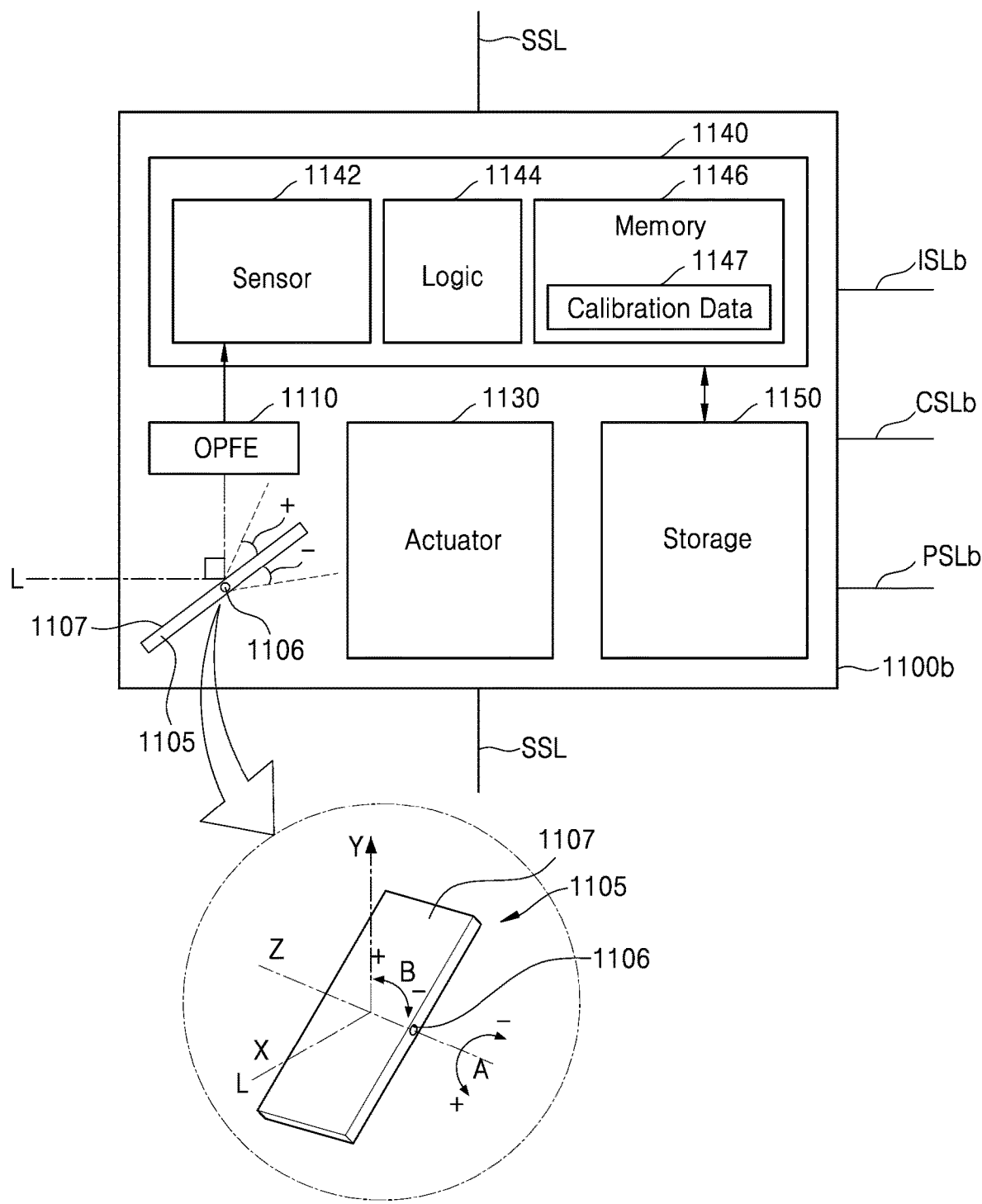
FIG. 15 is a block diagram illustrating the camera module of FIG. 14 according to an embodiment.

FIG. 14 is a block diagram of an electronic device including a multi-camera module (also referred to herein interchangeably as a multi-camera device) according to some embodiments. FIG. 15 is a detailed block diagram of the camera module of FIG. 14 according to some embodiments.

With reference to FIG. 14, the electronic device 1000 may include a camera module group 1100, an application processor 1200, a PMIC 1300, and an external memory 1400.

The camera module group 1100 may include a plurality of camera modules 1100a, 1100b, and 1100c. As used herein, a camera module may be interchangeably referred to as a "camera," a "camera device," or the like. Although some embodiments, including the embodiments shown in FIG. 14, include a camera module group 1100 in which three camera modules 1100a, 1100b, and 1100c are arranged, the embodiments are not limited thereto. In some embodiments, the camera module group 1100 may be modified and include only two camera modules. Also, in some embodiments, the camera module group 1100 may be modified and include k camera modules (k is a natural number greater than or equal to 4.)

Hereinafter, the detailed configuration of camera module 1100b is further described with reference to FIG. 15, and the descriptions may be applied to the other camera modules 1100a and 1100b as well according to embodiments.

With reference to FIG. 15, the camera module 1100b may include a prism 1105, an optical path folding element (OPFE) 1110, an actuator 1130, an image sensing device 1140, and a storage 1150.

The prism 1105 may include a reflector 1107 made of light reflective materials, and may change the direction of light L incident from outside.

In some embodiments, the prism 1105 may change the direction of the light L incident in the first direction (the X direction) to the second direction (the Y direction) perpendicular to the first direction (the X direction.) Further, the prism 1105 may rotate the reflector 1107 made of light reflective materials around a central axis 1106 in an A direction or rotate the central axis 1106 in a B direction to change the direction of the light L incident in the first direction (the X direction) to the second direction (the Y direction) perpendicular to the first direction. At this time, the OPFE 1110 may also move in the third direction (the Z direction) perpendicular to the first direction (the X direction) and the second direction (the Y direction).

In some embodiments, as illustrated in the drawings, the maximum rotation angle of the prism 1105 in the A direction may be less than or equal to 15 degrees in +A direction, and greater than 15 degrees in −A direction; however, the embodiments are not limited thereto.

In some embodiments, the prism 1105 may move within 20 degrees in + or −B direction, or within 10 degrees to 20 degrees, or within 15 degrees to 20 degrees, and the movement may be made by the same angle in +B direction and in −B direction, or a similar angle, i.e., within an angle difference of 1 degree.

In some embodiments, the prism 1105 may move the reflector 1107 including light reflective materials in the third direction (e.g., the Z direction) parallel to the extending direction of the central axis 1106.

The OPFE 1110 may include an optical lens consisting of, for example, m groups (m is a natural number.) The m lens may change an optical zoom ratio of the camera module 1100b by moving in the second direction (the Y direction.) For example, when the initial optical zoom ratio of the camera module 1100b is Z, and m optical lens included in the OPFE 1110 are moved, the optical zoom ratio of the camera module 1100b may be changed to 3Z, 5Z, or greater than 5Z.

The actuator 1130 may move the OPFE 1110 or the optical lens to a particular position. For example, the actuator 1130 may adjust the position of the optical lens so that the image sensor 1142 may be arranged at a focal length of the optical lens for accurate sensing.

The image sensing device 1140 may include an image sensor 1142, a control logic 1144, and a memory 1146. The image sensor 1142 may be any of the image sensors according to any of the embodiments. The image sensor 1142 may sense an image of an object by using light L provided through the optical lens. The image sensor 1142 may generate image data having a high operating range by merging HCG image data and LCG image data.

The control logic 1144 may control overall operations of the camera module 1100b. For example, the control logic 1144 may control operations of the camera module 1100b according to control signals provided through a control signal line CSLb.

The memory 1146 may store data required for operations of the camera module 1100b, such as calibration data 1147. The calibration data 1147 may include information necessary for the camera module 1100b to generate image data by using light L provided from the outside. The calibration data 1147 may include, for example, information regarding degree of rotation, information regarding focal length, information regarding optical axis, etc. as described above. When the camera module 1100b is implemented in the form of multi state camera in which a focal length varies according to a position of an optical lens, the calibration data 1147 may include information regarding a focal length according to a position (or a state) of the optical lens, and auto focusing.

The storage 1150 may store image data sensed through the image sensor 1142. The storage 1150 may be arranged outside of the image sensing device 1140, and may be implemented in a structure in which the storage 1150 and a sensor chip constituting the image sensing device 1140 are stacked. In some embodiments, the storage 1150 may be implemented as an electrically erasable programmable read-only memory (EEPROM), but the embodiments are not limited thereto.

With reference to FIGS. 14 and 15, in some embodiments, each of the plurality of camera modules 1100a, 1100b, and 1100c may include the actuator 1130. Accordingly, each of the plurality of camera modules 1100a, 1100b, and 1100c may include the same or similar calibration data 1147 according to an operation of the actuator included therein.

In some embodiments, one camera module (e.g., 1100b) of the plurality of camera modules 1100a, 1100b, and 1100c may be a folded lens camera module including the prism 1105 and the OPFE 1110 described above, and the rest of the camera modules (e.g., 1100a and 1100b) may be a vertical camera module which does not include the prism 1105 and the OPFE 1110. However, the embodiments are not limited thereto.

In some embodiments, one camera module (e.g., 1100c) of the plurality of camera modules 1100a, 1100b, and 1100c may be, for example, a vertical depth camera extracting depth information by using infrared ray (IR). In such a case, the application processor 1200 may generate a 3D depth image by merging image data provided from the depth camera and image data provided from other camera module (e.g., 1100a or 1100b.)

In some embodiments, at least two camera modules (e.g., 1100a and 1100b) of the plurality of camera modules 1100a, 1100b, and 1100c may have different fields of view. In some embodiments, for example, at least two camera modules (e.g., 1100a and 1100b) of the plurality of camera modules 1100a, 1100b, and 1100c may have different optical lens, but embodiments are not limited thereto.

Further, in some embodiments, a field of view of each of the plurality of camera modules 1100a, 1100b, and 1100c may be different. In some embodiments, an optical lens included in each of the plurality of camera modules 1100a, 1100b, and 1100c may also be different, but embodiments are not limited thereto.

In some embodiments, each of the plurality of camera modules 1100a, 1100b, and 1100c may be physically separated. That is, a sensing area of one image sensor 1142 is not divided to be used by the plurality of camera modules 1100a, 1100b, and 1100c, but an independent image sensor 1142 may be arranged in each of the plurality of camera modules 1100a, 1100b, and 1100c.

With reference to FIG. 14, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented in separate semiconductor chips.

The image processing device 1210 may include sub-image processors 1212a, 1212b, and 1212c, an image generator 1214, and a camera module controller 1216.

The image processing device 1210 may include the plurality of sub-image processors 1212a, 1212b, and 1212c which respectively corresponding to the plurality of camera modules 1100a, 1100b, and 1100c.

Image data generated from each of the camera modules 1100a, 1100b, and 1100c may be provided to a corresponding sub-image processor 1212a, 1212b, and 1212c through image signal lines ISLa, ISLb, and ISLc separated from each other. For example, the image data generated from the camera module 1100a may be provided to the sub-image processor 1212a through the image signal line ISLa, the image data generated from the camera module 1100b may be provided to the sub-image processor 1212b through the image signal line ISLb, and the image data generated from the camera module 1100c may be provided to the sub-image processor 1212c through the image signal line ISLc. Such image data transmission may be performed by, for example, a camera serial interface (CSI) based on a mobile industry processor interface (MPI), but the embodiments are not limited thereto.

In some embodiments, one sub-image processor may be arranged in correspondence with a plurality of camera modules. For example, instead of the sub-image processor 1212a and the sub-image processor 1212c being implemented separately as illustrated in the drawings, they may be implemented as one integrated sub-image processor, and image data provided from the camera module 1100a and the camera module 1100c may be selected by a selection element, etc. (e.g., a multiplexer) to be provided to the integrated sub-image processor.

The image data provided to each of the sub-image processor 1212a, 1212b, and 1212c may be provided to the image generator 1214. The image generator 1214 may generate an output image by using image data provided from each of the sub-image processor 1212a, 1212b, and 1212c according to image generating information or a mode signal.

Specifically, the image generator 1214 may generate an output image by merging at least some of image data generated from the camera modules 1100a, 1100b, and 1100c having different fields of view according to image generating information or a mode signal. Also, the image generator 1214 may generate an output image by selecting any one piece of image data generated from the camera modules 1100a, 1100b, and 1100c having different fields of view according to image generating information or a mode signal.

In some embodiments, the image generating information may include a zoom signal or a zoom factor. Also, in some embodiments, the mode signal may be, for example, a signal based on a mode selected by a user.

When the image generating information is a zoom signal (or a zoom factor), and each of the camera modules 1100a, 1100b, and 1100c have different fields of view, the image generator 1214 may perform different operations according to a type of the zoom signal. For example, when the zoom signal is a first signal, the image generator 1214 may generate an output image by merging image data output from the camera module 1100a and image data output from the camera module 1100c, and then using the merged image signal and image data output from the camera module 1100b, which has not been used for data merging. When the zoom signal is a second signal, which is different from the first signal, the image generator 1214 may not perform such image data merging, and generate an output image by selecting any one piece of image data output from each of the camera modules 1100a, 1100b, and 1100c. However, the embodiments are not limited thereto, and the method of processing image data may be modified in various ways, if necessary.

In some embodiments, the image generator 1214 may receive multiple pieces of image data having different exposure time from at least one of the plurality of sub-image processors 1212a, 1212b, or 1212c, and perform HDR processing on the multiple pieces of image data to generate a merged image data having an increased dynamic range.

The camera module controller 1216 may provide a control signal to each of the camera modules 1100a, 1100b, and 1100c. The control signal generated from the camera module controller 1216 may be provided to the corresponding camera module 1100a, 1100b, and 1100c through the control signal lines CSLa, CSLb, and CSLc separated from each other.

At least one of the plurality of camera modules 1100a, 1100b, or 1100c may be designated as a master camera (e.g., 1100b) according to the image generating information or the mode signal including the zoom signal, and the rest of the camera modules (e.g., 1100a and 1100c) may be designated as slave cameras. Such information may be included in the control signal and be provided to the corresponding camera module 1100a, 1100b, and 1100c through the control signal lines CSLa, CSLb, and CSLc separated from each other.

According to a zoom factor or an operational mode signal, a camera module operating as a master camera or a slave camera may be changed. For example, when the field of view of the camera module 1100a is wider than that of the camera module 1100b, and the zoom factor has a low zoom ratio, the camera module 1100b may operate as a master, and the camera module 1100a may operate a slave. On the contrary, when the zoom factor has a high zoom ratio, the camera module 1100a may operate as a master, and the camera module 1100b may operate as a slave.

In some embodiments, the control signal provided to each of the camera modules 1100a, 1100b, and 1100c from the camera module controller 1216 may include a sync enable signal. For example, when the camera module 1100b is a master camera, and the camera modules 1100a and 1100c are slave cameras, the camera module controller 1216 may transmit the sync enable signal to the camera module 1100b. The camera module 1100b provided with such sync enable signal may generate a sync signal based on the provided sync enable signal, and provide the generated sync signal to the camera modules 1100a and 1100c through a sync signal line SSL. The camera module 1100b and the camera modules 1100a and 1100c may be synchronized with the sync signal and transmit image data to the application processor 1200.

In some embodiments, the control signal provided to the plurality of camera modules 1100a, 1100b, and 1100c from the camera module controller 1216 may include mode information according to the mode signal. Based on the mode information, the plurality of camera modules 1100a, 1100b, and 1100c may operate in a first operational mode and a second operational mode with respect to a sensing speed.

The plurality of camera modules 1100a, 1100b, and 1100c may generate an image signal at a first speed in the first operational mode (e.g., generate an image signal of a first frame rate), encode the image signal at a second speed which is higher than the first speed (e.g., encode an image signal of a second frame rate higher than the first frame rate), and transmit the encoded image signal to the application processor 1200. At this time, the second speed may be 30 times less than the first speed.

The application processor 1200 may store the received image signal, i.e., the encoded image signal in the internal memory 1230 or the external memory 1400 outside the application processor 1200, read out from the internal memory 1230 or the external memory 1400 the encoded image signal for decoding, and display image data generated based on the decoded image signal. For example, a corresponding sub-processor of the plurality of sub-image processors 1212a, 1212b, and 1212c of the image processing device 1210 may perform the decoding, and the image processing on the decoded image signal.

The plurality of camera modules 1100a, 1100b, and 1100c may generate an image signal at a third speed which is lower than the first speed in the second operational mode (e.g., generate an image signal of a third frame rate lower than the first frame rate) and transmit the image signal to the application processor 1200. The image signal provided to the application processor 1200 may be a signal which has not been encoded. The application processor 1200 may perform the image processing on the received image signal or store the image signal in the internal memory 1230 or the external memory 1400.

The PMIC 1300 may provide power, for example, a power voltage to each of the plurality of camera modules 1100a, 1100b, and 1100c. For example, the PMIC 1300 may provide, under the control by the application processor 1200, a first power to the camera module 1100a through a power signal line PSLa, a second power to the camera module 1100b through a power signal line PSLb, and a third power to the camera module 1100c through a power signal line PSLc.

The PMIC 1300 may generate power corresponding to each of the plurality of camera modules 1100a, 1100b, and 1100c in response to a power control signal PCON from the application processor 1200 and adjust a level of power. The power control signal PCON may include a power adjustment signal for each operational mode of the plurality of camera modules 1100a, 1100b, and 1100c. For example, the operational mode may include a low power mode, and in such a case, the power control signal PCON may include information regarding camera modules operating in the low power mode and a set power level. The level of power provided to each of the plurality of camera modules 1100a, 1100b, and 1100c may be identical or different. Also, the power level may be changed dynamically.

As described herein, any devices, electronic devices, modules, units, and/or portions thereof according to any of the embodiments, and/or any portions thereof (including, without limitation, the image sensor 10, driver 12, read-out circuit 13, controller 14, signal processor 15, electronic device 1000, application processor 1200, image generator 1214, sub-image processors 1212a, 1212b, 1212c, camera module controller 1216, memory controller 1220, PMIC 1300, external memory 1400, internal memory 1230, image sensing device 1140, control logic 1144, image sensor 1142, storage 1150, OPFE 1110, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, an FPGA, and programmable logic unit, a microprocessor, application-specific integrated circuit (ASIC), a neural network processing unit (NPU), an Electronic Control Unit (ECU), an Image Signal Processor (ISP), and the like. In some embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the embodiments.

Any of the memories described herein, including, without limitation, storage 950, internal memory 1230, external memory 1400, memory 1146, and/or storage 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

While aspects of embodiments have been particularly shown and described, it will be understood that various changes in form and details may be made therein without departing from the spirit and scope of the following claims.

What is claimed is:
1. An image sensor comprising:
a pixel array comprising a plurality of pixels;
a controller configured to control a first pixel group of the plurality of pixels to have a first exposure integration time, a second pixel group of the plurality of pixels to have a second exposure integration time and a third pixel group of the plurality of pixels to have a third exposure integration time; and a signal processor configured to generate image data based on digital signals corresponding to pixel signals generated by the pixel array, by performing operations on a first value of the digital signals corresponding to the first pixel group, a second value of the digital signals corresponding to the second pixel group and a third value of the digital signals corresponding to the third pixel group, wherein the first pixel group has a fixed position and the first exposure integration time of the first pixel group is independent of illuminance of the image data, and wherein the signal processor is further configured to identify the second pixel group and the third pixel group based on the illuminance.

2. The image sensor of claim 1, wherein the signal processor is further configured to identify the illuminance based on the digital signals, identify the second exposure integration time based on the illuminance, and set the controller based on the second pixel group and the second exposure integration time.

3. The image sensor of claim 2, wherein the first pixel group comprises a plurality of first rows of the pixel array,
wherein the second pixel group comprises at least one second row between two of the plurality of first rows, and
wherein the second pixel group comprises another second row between a different two of the plurality of first rows.

4. The image sensor of claim 2, wherein the signal processor is further configured to normalize the first value and the second value, and reduce a weight of the second value based on a difference between the normalized first value and the normalized second value being greater than or equal to a reference value.

5. The image sensor of claim 1, wherein each of the plurality of pixels comprises a first photoelectric element and a second photoelectric element that is larger than the first photoelectric element, and
wherein the controller is further configured to control the first photoelectric element of each pixel of the second pixel group to have the second exposure integration time and the second photoelectric element of each pixel of the second pixel group to have a fourth exposure integration time that is different from the second exposure integration time.

6. The image sensor of claim 5, wherein the second exposure integration time is equal to or less than the first exposure integration time when the illuminance is greater than a first threshold value, and
wherein the fourth exposure integration time is equal to or greater than the second exposure integration time when the illuminance is greater than the first threshold value.

7. The image sensor of claim 5, wherein the second exposure integration time is equal to or greater than the first exposure integration time when the illuminance is less than a second threshold value, and
wherein the fourth exposure integration time is equal to or less than the second exposure integration time when the illuminance is less than the second threshold value.

8. The image sensor of claim 5, wherein the controller is further configured to control the first photoelectric element and the second photoelectric element of each pixel of the first pixel group to have the first exposure integration time, and wherein the first exposure integration time is longer than the second exposure integration time and shorter than the fourth exposure integration time.

9. The image sensor of claim 1, wherein the signal processor is further configured to control each of the plurality of pixels to have a first conversion gain or a second conversion gain based on a value of the digital signals.

10. The image sensor of claim 1, wherein the signal processor is further configured to normalize at least one of the first value and the second value based on the first exposure integration time and the second exposure integration time, and calculate a weighted sum of the normalized first value and the normalized second value.

11. The image sensor of claim 1, wherein the signal processor is further configured to identify the second pixel group by assigning pixels, of the plurality of pixels, to the second pixel group based on the illuminance.

12. An image sensor comprising:
a pixel array comprising a plurality of pixels;
a controller configured to control a first pixel group of the plurality of pixels to have a first exposure integration time, a second pixel group of the plurality of pixels to have a second exposure integration time and a third pixel group of the plurality of pixels to have a third exposure integration time; and
a signal processor configured to identify an illuminance based on digital signals corresponding to pixel signals generated by the pixel array, identify both the second pixel group and the second exposure integration time based on the illuminance, identify both the third pixel group and the third exposure integration time based on the illuminance, and set the controller based on the second exposure integration time and the third exposure integration time,
wherein the first pixel group has a fixed position and the first exposure integration time of the first pixel group is independent of the illuminance.

13. The image sensor of claim 12, wherein the first pixel group comprises a plurality of first rows in the pixel array that are spaced apart from each other at equal intervals, and
wherein the second pixel group comprises at least two of a plurality of second rows between two different pairs of the plurality of first rows.

14. The image sensor of claim 12, wherein the signal processor is further configured to normalize a first value of the digital signals corresponding to the first pixel group and a second value of the digital signals corresponding to the second pixel group, based on the first exposure integration time and the second exposure integration time.

15. The image sensor of claim 14, wherein the signal processor is further configured to generate image data based on a weighted sum of the normalized first value and the normalized second value.

16. The image sensor of claim 14, wherein the signal processor is further configured to reduce a weight of the second value when a difference between the normalized first value and the normalized second value is greater than or equal to a reference value.

17. The image sensor of claim 12, wherein each of the plurality of pixels comprises a first photoelectric element and a second photoelectric element that is larger than the first photoelectric element, and
wherein the signal processor is configured to set the controller such that the first photoelectric element of each pixel of the second pixel group have the second exposure integration time and the second photoelectric element of each pixel of the second pixel group have a fourth exposure integration time different from the second exposure integration time.

18. The image sensor of claim 17, wherein the second exposure integration time is equal to or less than the first exposure integration time when the illuminance is greater than a first threshold value, and
wherein the fourth exposure integration time is equal to or greater than the second exposure integration time when the illuminance is greater than the first threshold value.

19. The image sensor of claim 17, wherein the second exposure integration time is equal to or greater than the first exposure integration time when the illuminance is less than a second threshold value, and
wherein the fourth exposure integration time is equal to or less than the second exposure integration time when the illuminance is less than the second threshold value.

20. A method performed by an image sensor, the method comprising:
generating digital signals based on pixel signals generated by a pixel array comprising a plurality of pixels;
identifying a second pixel group of the plurality of pixels based on illuminance;
identifying a third pixel group of the plurality of pixels based on illuminance;
driving a first pixel group of the plurality of pixels to have a first exposure integration time, the second pixel group to have a second exposure integration time and the third pixel group to have a third exposure integration time; and
generating image data based on a weighted sum of a first value of the digital signals corresponding to the first pixel group, a second value of the digital signals corresponding to the second pixel group and a third value of the digital signals corresponding to the third pixel group,
wherein the first pixel group has a fixed position and the first exposure integration time of the first pixel group is independent of the illuminance of the image data.

* * * * *